US012587709B2

(12) United States Patent
Chen

(10) Patent No.: US 12,587,709 B2
(45) Date of Patent: Mar. 24, 2026

(54) ON-SCREEN COMMENT DISPLAY METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventor: Lizhuo Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 71 days.

(21) Appl. No.: 18/316,070

(22) Filed: May 11, 2023

(65) Prior Publication Data

US 2023/0283855 A1 Sep. 7, 2023

Related U.S. Application Data

(63) Continuation of application No. PCT/CN2022/109824, filed on Aug. 3, 2022.

(30) Foreign Application Priority Data

Aug. 31, 2021 (CN) .......................... 202111015002.4

(51) Int. Cl.
*H04N 21/4788* (2011.01)
*H04N 21/431* (2011.01)

(52) U.S. Cl.
CPC ..... *H04N 21/4788* (2013.01); *H04N 21/4316* (2013.01)

(58) Field of Classification Search
CPC ...................... H04N 21/4788; H04N 21/4316
See application file for complete search history.

(56) References Cited

U.S. PATENT DOCUMENTS 9,031,382 B1* 5/2015 Kaiser .............. H04N 21/47205
386/248
2013/0013089 A1* 1/2013 Kawakami ......... H04N 21/8153
700/90

(Continued)

FOREIGN PATENT DOCUMENTS

CN 108055593 A 5/2018
CN 108401175 A 8/2018

(Continued)

OTHER PUBLICATIONS

The World Intellectual Property Organization (WIPO) International Search Report for PCT/CN2022/109824 Nov. 1, 2022 12 Pages (including translation).

(Continued)

*Primary Examiner* — Mishawn N. Hunter
(74) *Attorney, Agent, or Firm* — Anova Law Group, PLLC

(57) ABSTRACT

An on-screen comment display method includes: acquiring an on-screen comment data set of a video, the on-screen comment data set including at least one on-screen comment; selecting, from the on-screen comment data set, a plurality of target on-screen comments associated with a target word; and generating annotation information corresponding to the plurality of target on-screen comments, the annotation information indicating information related to combine and display the plurality of target on-screen comments to form a graphic associated with the target word.

18 Claims, 10 Drawing Sheets

(56)                    References Cited

U.S. PATENT DOCUMENTS

| | | | |
|---|---|---|---|
| 2017/0336960 A1* | 11/2017 | Chaudhri | ................. H04L 51/18 |
| 2018/0034879 A1* | 2/2018 | Chegini | ................. G06Q 50/08 |
| 2020/0213655 A1* | 7/2020 | Feng | ........................ G10L 13/00 |
| 2020/0322688 A1* | 10/2020 | Lehtiniemi | ........ H04N 21/4788 |
| 2021/0160553 A1 | 5/2021 | Yu et al. | |
| 2022/0013026 A1* | 1/2022 | Di | ........................ G06F 16/7837 |
| 2022/0122301 A1* | 4/2022 | Gehlaut | .................... G06T 7/13 |
| 2022/0201364 A1 | 6/2022 | Kong | |

FOREIGN PATENT DOCUMENTS

| | | | |
|---|---|---|---|
| CN | 111294663 A | 6/2020 |
| CN | 111901662 A | 11/2020 |
| CN | 112188275 A | 1/2021 |
| CN | 112383831 A | 2/2021 |
| CN | 113010710 A | 6/2021 |

OTHER PUBLICATIONS

China National Intellectual Property Administration (CNIPA) Office Action for Application No. 202111015002.4 Mar. 22, 2025 17 Pages (including translation).

* cited by examiner

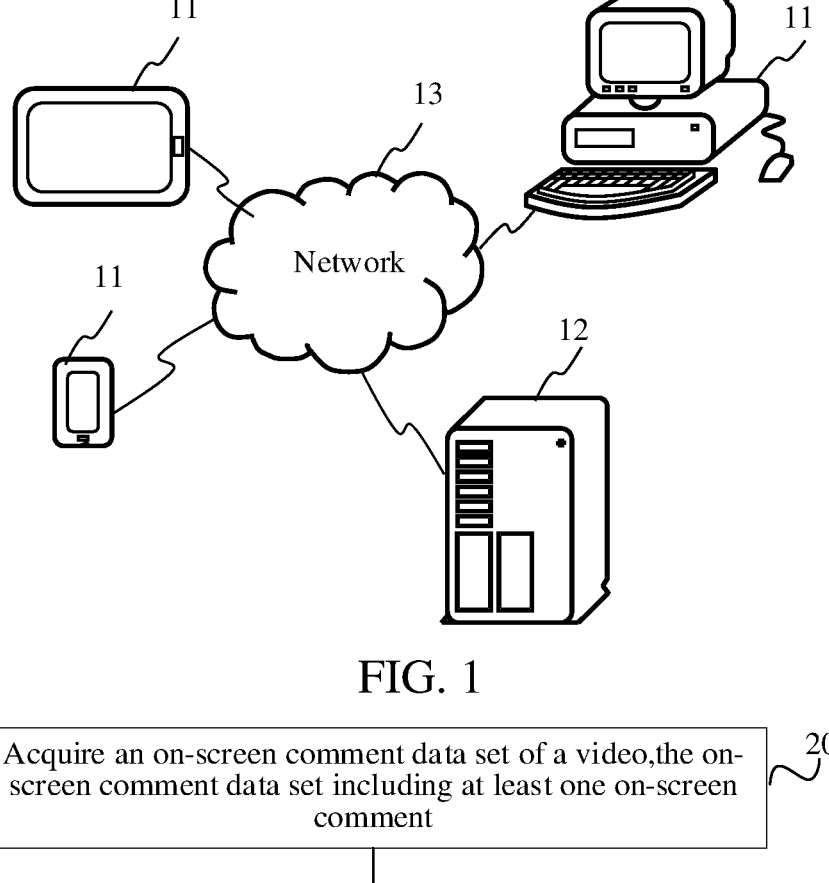

11

11

13

11

12

Network

FIG. 1

Acquire an on-screen comment data set of a video,the on-screen comment data set including at least one on-screen comment

201

Select, from the on-screen comment data set, a plurality of target on-screen comments associated with a target word

202

Generate annotation information corresponding to the plurality of target on-screen comments, the annotation information indicating information related to combine and display the plurality of target on-screen comments to form a graphic associated with the target word

Play back a video in a video playback interface ⌇801

Display the on-screen comments of the video during playback of the video ⌇802

Combine and display, within a target playback time period of the video, the plurality of target on-screen comments associated with the target word to form the graphic associated with the target word ⌇803

1100

1100

1300

1301

Video playback module

1302

On-screen comment display module

1403

1400

1401

Processor

1402

Memory

Peripheral device interface

1404

Radio frequency circuit

1405

Display screen

1406

Camera component

1407

Audio circuit

1408

Positioning component

1409

Power supply

ON-SCREEN COMMENT DISPLAY METHOD AND APPARATUS, DEVICE, AND STORAGE MEDIUM

CROSS-REFERENCES TO RELATED APPLICATIONS

This application is a continuation application of PCT Patent Application No. PCT/CN2022/109824, entitled "BULLET-SCREEN COMMENT DISPLAY METHOD AND APPARATUS, AND DEVICE AND STORAGE MEDIUM" and filed on Aug. 3, 3022, which claims priority to Chinese Patent Application No. 202111015002.4 filed with China National Intellectual Property Administration on Aug. 31, 2021, and entitled "ON-SCREEN COMMENT DISPLAY METHOD AND APPARATUS, DEVICE, AND STORAGE MEDIUM", the entire contents of both of which are incorporated herein by reference.

FIELD OF THE TECHNOLOGY

Embodiments of the present disclosure relate to the field of Internet technologies, and particularly to an on-screen comment display technology.

BACKGROUND OF THE DISCLOSURE

With the development of Internet technologies, a user may express a view or a comment on a video in a form of an on-screen comment when watching the video, or may also obtain views or comments of other users on the video by means of on-screen comments displayed during playback of the video.

In related technologies, the on-screen comments sent by the users are sequentially displayed according to a video playback time when the users send the on-screen comments. For example, when user A sends an on-screen comment 1 at a first playback time and user B sends an on-screen comment 2 at a second playback time after the first playback time, a terminal device sequentially displays the on-screen comment 1 and the on-screen comment 2 in a smooth manner from right to left during the playback of the video, but this on-screen comment display manner is relatively simple.

SUMMARY

The embodiments of the present disclosure provide an on-screen comment display method and apparatus, a device, and a storage medium, being capable of improving the diversity of on-screen comment display during playback of a video and enriching the display effect of an on-screen comment. The technical solutions are as follows.

According to one aspect of the embodiments of the present disclosure, provided is an on-screen comment display method, executed by a computer device, the method including: acquiring an on-screen comment data set of a video, the on-screen comment data set comprising at least one on-screen comment; selecting, from the on-screen comment data set, a plurality of target on-screen comments associated with a target word; and generating annotation information corresponding to the plurality of target on-screen comments, the annotation information indicating information related to combine and display the plurality of target on-screen comments to form a graphic associated with the target word.

According to one aspect of the embodiments of the present disclosure, provided is an on-screen comment display method, executed by a terminal, the method including: playing back a video in a video playback interface; displaying on-screen comments of the video during playback of the video; and combining and displaying, within a target playback time period of the video, a plurality of target on-screen comments associated with a target word to form a graphic associated with the target word.

According to one aspect of the embodiments of the present disclosure, provided is an on-screen comment display apparatus, the apparatus including: an on-screen comment set acquisition module, configured to acquire an on-screen comment data set of a video, the on-screen comment data set including at least one on-screen comment; a target on-screen comment selection module, configured to select, from the on-screen comment data set, a plurality of target on-screen comments associated with a target word; and an annotation information generation module, configured to generate annotation information corresponding to the plurality of target on-screen comments, the annotation information indicating information related to combine and display the plurality of target on-screen comments to form a graphic associated with the target word.

According to one aspect of the embodiments of the present disclosure, provided is an on-screen comment display apparatus, the apparatus including: a video playback module, configured to play back a video in a video playback interface; and an on-screen comment display module, configured to display on-screen comments of the video during playback of the video, the on-screen comment display module being further configured to combine and display, within a target playback time period of the video, a plurality of target on-screen comments associated with a target word to form a graphic associated with the target word.

According to one aspect of the embodiments of the present disclosure, provided is a computer device, the computer device including at least one processor and at least one memory, the at least one memory storing at least one instruction, at least one program, and a code set or an instruction set, and the at least one instruction, the at least one program, the code set or the instruction set being loaded and executed by the at least one processor to implement the on-screen comment display method.

In some embodiments, the computer device may be a terminal or a server.

According to one aspect of the embodiments of the present disclosure, provided is a non-transitory computer-readable storage medium, the readable storage medium storing at least one instruction, at least one program, and a code set or an instruction set, the at least one instruction, the at least one program, the code set or the instruction set being loaded and executed by at least one processor to implement the on-screen comment display method.

The technical solutions provided by the embodiments of the present disclosure may yield the following beneficial effects: by generating annotation information used for instructing to combine and display a plurality of target on-screen comments to form a graphic associated with a target word, the plurality of target on-screen comments associated with the target word are controlled according to the annotation information during on-screen comment display to be combined and displayed according to the graphic corresponding to the target word, and thus, the display manner of the on-screen comment is enriched and the diversity and display effect of on-screen comment display are improved.

BRIEF DESCRIPTION OF THE DRAWINGS

FIG. 1 is a schematic diagram of a solution implementation environment provided according to an embodiment of the present disclosure.

FIG. 2 is a flowchart of an on-screen comment display method provided according to an embodiment of the present disclosure.

DESCRIPTION OF EMBODIMENTS

Figure 3:
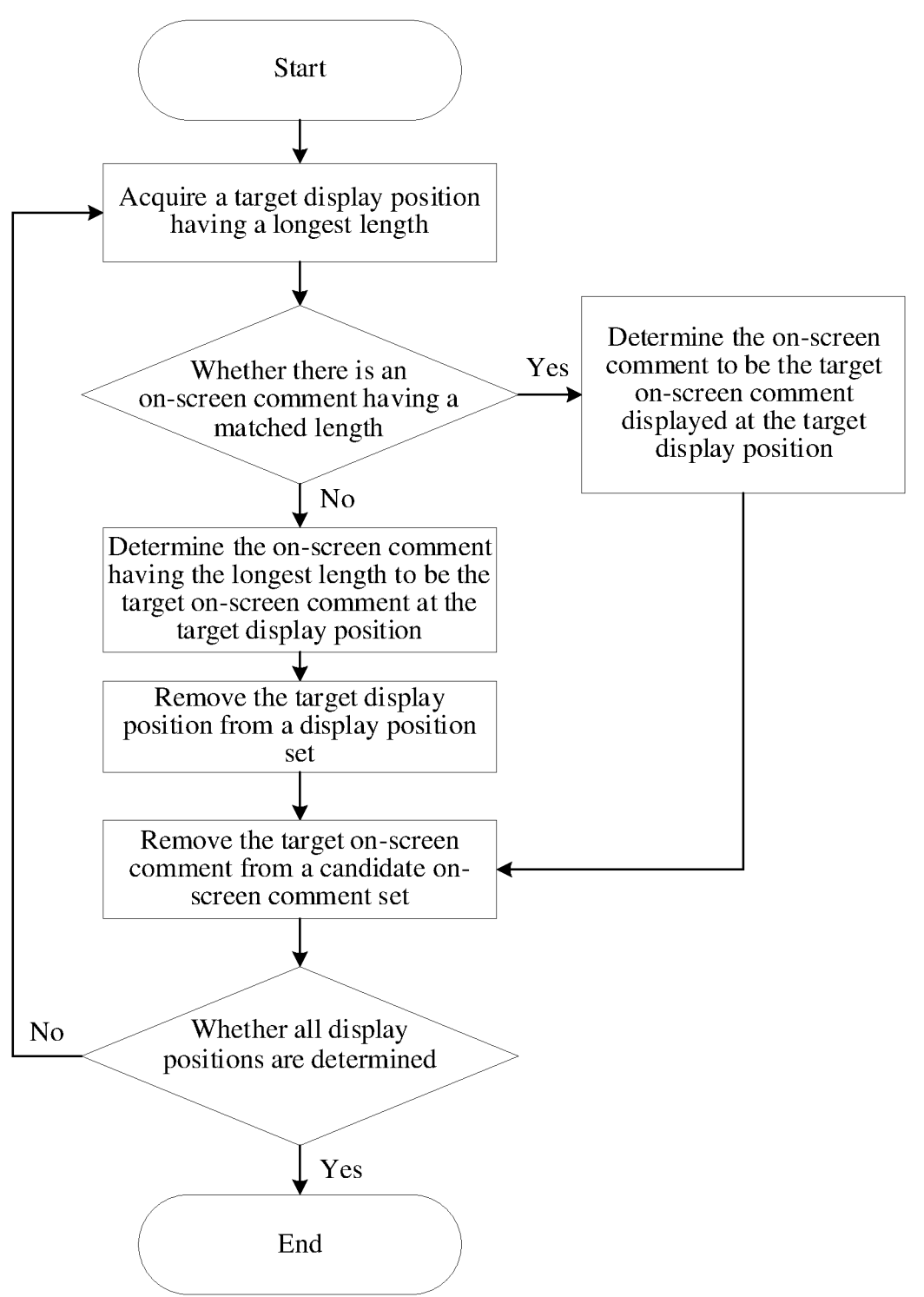
FIG. 3 is a flowchart of a target on-screen comment selection method provided according to an embodiment of the present disclosure.

To describe the purpose, the technical solutions and the advantages of the present disclosure more clearly, implementation manners of the present disclosure are further described in details below with reference to the accompanying drawings.

With reference to FIG. 1, FIG. 1 is a schematic diagram of a solution implementation environment provided according to an embodiment of the present disclosure. The solution implementation environment may be regarded as a video playback system. The solution implementation environment may include a terminal 11 and a server 12.

The terminal 11 may be an electronic device, such as a mobile phone, a tablet computer, a multimedia playback device, a personal computer (PC), a wearable device, a smart TV, and a vehicle-mounted terminal. A client that runs a target application may be installed in the terminal 11. The target application may be any application having a video playback function (including an on-screen comment display function). For example, the target application may be a video playback application, an entertainment live broadcast application, a music playback application, etc. The embodiment of the present disclosure does not limit this.

The server 12 may be configured to provide background service for the client of the target application (such as the video playback application) in the terminal 11. For example, the server 12 may be a background server of the aforementioned target application (such as the video playback application), and may provide video resource management, on-screen comment management and other service for the aforementioned target application. The server 12 may be one server, and may also be a server cluster composed of a plurality of servers, or a cloud computing service center.

The terminal 11 may communicate with the server 12 by means of a network 13. The network 13 may be a wired network, and may also be a wireless network.

Exemplarily, the server 12 may select a target on-screen comment from the on-screen comments of the video, then determines the display form of the target on-screen comment (for example, a target word shared by a plurality of target on-screen comments may be selected, and the form of combining and displaying the plurality of target on-screen comments is determined on the basis of a graphic corresponding to the target word), and generates corresponding annotation information. In response to a playback operation of a user for a video, the terminal 11 (such as the client of the target application) obtains a video resource, an on-screen comment resource, and the annotation information and the like of the video from the server 12. During playback of the video, the target on-screen comment is displayed in the display form of the target on-screen comment according to the annotation information.

In some other embodiments, the terminal 11 (such as the client of the target application) may also select the target on-screen comment from the on-screen comments of the video, then determines the display form of the target on-screen comment, and generates the corresponding annotation information. Moreover, the terminal 11 (such as the client of the target application) displays the target on-screen comment in the display form of the target on-screen comment according to the annotation information during the playback of the video. The server 12 may provide the video and the on-screen comments of the video for the terminal 11.

With reference to FIG. 2, FIG. 2 is a flowchart of an on-screen comment display method provided according to an embodiment of the present disclosure. The execution subject of each step of the method may be a computer device, may specifically be the server 12 in the solution implementation environment shown in FIG. 1, and may also be the terminal 11 in the solution implementation environment shown in FIG. 1 (such as the client of the target application). To simplify the description, description is provided below by using the execution subject as the server. The method may include the following steps (201-203):

Step 201: Acquire an on-screen comment data set of a video, the on-screen comment data set including at least one on-screen comment.

In the embodiment of the present disclosure, the on-screen comment is a subtitle that pops up during playback of the video. For example, in a process that the client plays back the video, the view or comment content of a user on the video is displayed by sliding on the playback content of the video, and the view or comment content displayed in this display form may be referred to as the on-screen comment. In some embodiments, the text content of the on-screen comment may be simple words (such as apple, go, and start)

or sentences (such as looking forward to updating, and that is ridiculous). The text content of the on-screen comment may be in a Chinese form, or in a non-Chinese form (such as English and Japanese), or may be a mixture of Chinese words, foreign words, and other words. The embodiment of the present disclosure does not limit the text content of the on-screen comment.

The on-screen comment data set is a set of on-screen comments. For example, all on-screen comments corresponding to the video may form the on-screen comment data set of the video. The video may be any type of video, such as a game video, a movie video, a TV play video, and a self-made video. The on-screen comment may be sent by the user by means of the target application having an on-screen comment sending function. The on-screen comment may also carry the timestamp information of the generation of the on-screen comment, corresponding display timestamp information, and corresponding user identifier information.

During the playback of the video, the client may display the on-screen comment sent by the user, and send information corresponding to the on-screen comment (such as the text content and user representation information) to the background server of the client, and the background server performs unified storage on the on-screen comment and corresponding information thereof to form the on-screen comment data set of the video. When other clients obtain the video, the on-screen comment data set of the video is also sent to other clients.

Step 202: Select, from the on-screen comment data set, a plurality of target on-screen comments associated with a target word.

In the embodiment of the present disclosure, the target words are selected from the text content of each on-screen comment in the on-screen comment data set of the video, and the target words generally correspond to specific graphics. For example, the target words may be standard or regular language terms such as a tank, an apple, and an airplane, may also be popular terms (buzzwords, catchphrases, Internet slang, acronyms, keyboard symbols, abbreviations, etc.) such as "Xswl" (abbreviation of pinyin "xiao si wo le", which means I'm laughing so hard), "Yyds" (abbreviation of pinyin "yong yuan de shen," which is used to express praise) and "being protected by Buddha", and may also be abbreviated words such as "TK (tank)" and "Tiger (tank)". The embodiment of the present disclosure does not limit this.

The target on-screen comment is the on-screen comment associated with the target word in the on-screen comment data set. The text content of the target on-screen comment may carry the target word, and the text content of the target on-screen comment may also carry words having a semantic meaning identical or similar to the target word. For example, when the target word is "tank", the text content of the target on-screen comment may include the word "tank", and may also include the words "tank", "TK", "tiger", etc.

Not all on-screen comments with the target word or words having the identical or similar semantic meaning to the target word are target on-screen comments. The selection processes of the target word and the target on-screen comment are described below.

In some embodiments, step 202 may include the following sub-steps:

1. Word segmentation is performed on the on-screen comments in the on-screen comment data set to obtain a word data set.

In some embodiments, an natural language processing (NLP) word segmentation algorithm may be used for performing word segmentation on the text content of the on-screen comments to obtain a plurality of words to generate the word data set corresponding to the on-screen comment data set. In some embodiments, an NLP semantic segmentation algorithm may also be used for performing word segmentation on the text content of the on-screen comments to additionally segment non-standard words or word combinations.

Exemplarily, standard or regular nouns (such as a tank and an apple), popular phrases (such as "Xswl" and "Yyds"), string combinations (such as "this ~" and "ah ~"), and short phrases (such as "started" and "almost finished") may be used as training samples of a word segmentation model to train the word segmentation model. Finally, word segmentation is performed on the on-screen comments in the on-screen comment data set by means of the trained word segmentation model to obtain the word data set.

2. The target word is selected from the word data set.

In some embodiments, the selection process of the target word may be as follows: performing screening on the word data set according to an occurrence frequency of each word in the word data set to obtain a candidate word set; and determining, when a graphic information library includes graphic information corresponding to a target candidate word in the candidate word set, the target candidate word to be the target word, where the graphic information is used for indicating the graphic associated with the target word.

In the embodiment of the present disclosure, the quantity of the on-screen comment associated with a certain word may be determined to be the occurrence frequency of the word. For example, when the on-screen comment associated with a word appears once, the occurrence frequency of the word is increased by one. Herein, the on-screen comment associated with the word may be the on-screen comment carrying the word, and may also be the on-screen comment having the identical or similar semantic meaning to the word, which may be set according to an actual need. This is not limited in the embodiment of the present disclosure. In some embodiments, the quantity of the word may also be directly determined to be the occurrence frequency of the word.

The candidate word set includes a plurality of candidate words, and the candidate words may be words of which the occurrence frequencies meet a set threshold value. For example, words of which the occurrence frequencies are greater than the set threshold value may be determined to be the candidate words, or a threshold quantity of words may be determined on the basis of the occurrence frequencies, and these words are determined to be the candidate words.

Exemplarily, the generation process of the candidate word set may be as follows: the words in the word data set are sorted according to a descending order of the occurrence frequencies to obtain a word sequence, and a top threshold quantity (such as 8 and 10) of the words are selected from the word sequence to generate an initial candidate word set. Alternatively, the words in the word data set are sorted according to an ascending order of the occurrence frequencies to obtain a word sequence, and a last threshold quantity (such as 8 and 10) of the words are selected from the word sequence to generate the initial candidate word set. After the initial candidate word set is obtained, the words of which the occurrence frequencies do not meet the combined threshold value are removed from the initial candidate word set to obtain the candidate word set. The combined threshold value is used for ensuring that the quantity of the on-screen comments corresponding to the words may be used for completing the splicing of the graphic below.

In some embodiments, the graphic information library is used for storing the graphic information corresponding to the words. The graphic information is information used for indicating the content of a picture corresponding to the words. For example, during the process of creating the graphic information library, a designer may select new words, words having high popularity, popular words, standard or regular words and the like from the on-screen comments of the video, and match, for these words, pictures associated with these words, for example, the pictures corresponding to the word "tank" may include the content related to the "tank", and the pictures corresponding to the word "Xswl" may include the content related to "smiling and crying expression", and the pictures corresponding to the word "Band A" may be an emblem, a gesture and the like of "Band A". This is not limited in the embodiment of the present disclosure. In some embodiments, the server may periodically update the graphic information library, i.e., periodically selecting new words, words having high popularity, popular words, standard or regular words and the like, thereby generating new graphic information to be added to the graphic information library. In some embodiments, the server may also provide a graphic information query interface, and by means of the graphic information query interface, the client may query the graphic information of the word according to the word inputted by the user.

After determining the picture corresponding to the word, the graphic information corresponding to the picture may be obtained by using an edge search technology of picture processing. For example, the edge search technology of picture processing may be used for extracting the vector position information of main edge lines and the length information of the main edge lines from picture content, and these main edge lines may be used for simply outlining the picture content (i.e., the graphic), so that the user may identify the picture content by means of the picture. The graphic information may include the vector position information of the main edge lines and the length information of the main edge lines.

In some embodiments, each main edge line is a display position below, the vector position information of the main edge line is the position information of the display position, and the length information of the main edge line is the length information of the display position. According to all the main edge lines corresponding to the words, all the display positions corresponding to the words may be determined, and thus, a display position set corresponding to the words is generated.

In one example, the graphic information in the graphic information library is named as the word corresponding to the graphic information, and when the graphic information with the name of the target candidate word is retrieved in the graphic information library, the target candidate word may be determined to be the target word (that is, the target candidate word hits the graphic information in the graphic information library). When the graphic information with the name of the target candidate word is not retrieved in the graphic information library, the target candidate word may be deleted. In some embodiments, the graphic information in the graphic information library may also be named by combining the words corresponding to the graphic information, and words having the identical or similar semantic meanings to the words, etc. As long as it is detected that the name of the graphic information includes the target candidate word, the target candidate word may be determined to be the target word. In some embodiments, the target words may be multiple or 0.

In one feasible example, the initial candidate word set may be determined first, then the words, which do not hit the graphic information, in the initial candidate set may be removed to obtain the candidate word set, and finally, the candidate words of which the quantity of the on-screen comments is less than the quantity of the corresponding display positions in the candidate word set may be removed to obtain the target word set, and the words in the target word set are the target words. The target words may be selected more flexibly and accurately by selecting words on the basis of the quantity of the on-screen comments required for a combined graphic.

3. The on-screen comment associated with the target word is selected from the on-screen comment data set to generate the candidate on-screen comment set.

In some embodiments, the candidate on-screen comment set includes the plurality of candidate on-screen comments. The candidate on-screen comments may be the on-screen comments carrying the target word or the on-screen comments having the identical or similar semantic meaning to the target word. This is not limited in the embodiment of the present disclosure.

4. A plurality of target on-screen comments are selected from the candidate on-screen comment set.

In some embodiments, when the plurality of target words are included, each target word corresponds to the plurality of target on-screen comments.

In one example, the selection process of the target on-screen comment may be as follows: a plurality of display positions corresponding to the target word are determined according to the graphic information of the target word, and each display position is used for displaying the target on-screen comment; and the target on-screen comment of each display position is sequentially selected from the candidate on-screen comment set according to a descending order of lengths of the display positions.

In some embodiments, the display positions may be sorted according to the lengths of the display positions (according to a descending order or an ascending order), and then the target on-screen comments of the display positions may be sequentially determined according to the descending order of lengths of the display positions.

Exemplarily, by taking m display positions included in the graphic corresponding to the target word as an example, the selection process of the target on-screen comment is introduced, m is a positive integer, and the specific content may be as follows: the target on-screen comment displayed at an ith display position is determined according to a length of the ith display position in the m display positions and a length of each candidate on-screen comment in the candidate on-screen comment set, where i is a positive integer with a starting value of 1, and the length of the ith display position is greater than or equal to a length of a (i+1)th display position; the target on-screen comment of the ith display position is removed from the candidate on-screen comment set; and when i is less than m, i is equal to i plus 1, and execution is continued starting from an operation of determining the target on-screen comment at the ith display position according to the length of the ith display position in the m display positions and the length of each candidate on-screen comment in the candidate on-screen comment set.

For example, with reference to FIG. 3, a target display position having a longest length is first obtained from the display position set of the target word, and then it is retrieved, according to the length of the target display position, whether there is an on-screen comment having the same length from the candidate on-screen comment set.

When there is the on-screen comment having the same length, the on-screen comment is determined to be the target on-screen comment displayed at the target display position. When there is no the on-screen comment having the same length, the on-screen comment having the longest length in the candidate on-screen comment set is determined to be the target on-screen comment displayed at the target display position. Then the target display position is removed from the display position set, and the target on-screen comment at the target display position is removed from the candidate on-screen comment set. When the target on-screen comment at each display position in the display position set has not been completely determined, then a target display position having a longest length (that is, a display position having a second longest length) is obtained from the display position set, and the target on-screen comment at the display position having the second longest length is selected. In this way, the selection of target on-screen comments at all display positions in the display position set is sequentially completed.

Figure 4:
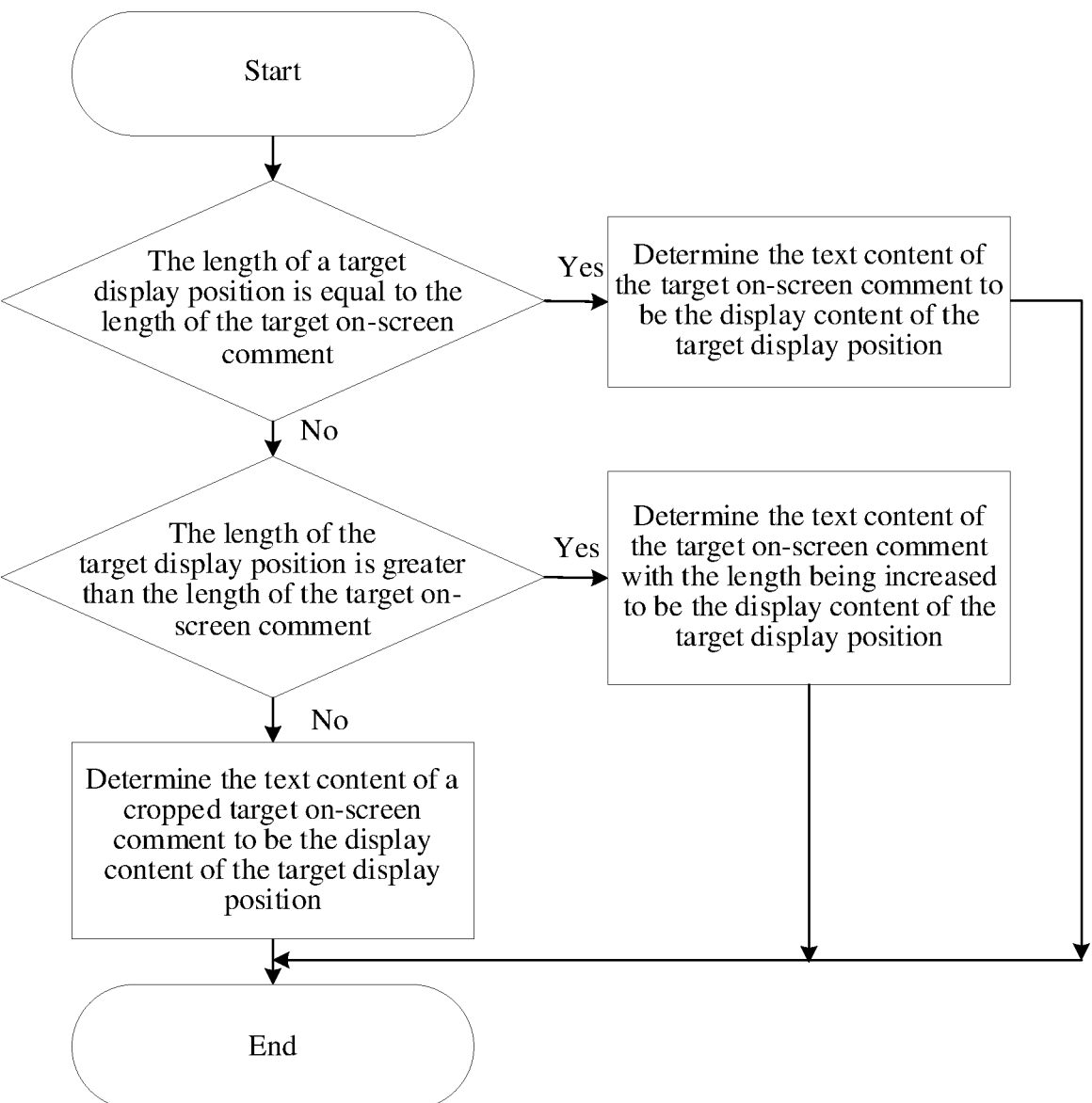
FIG. 4 is a flowchart of a method for determining display content of a server-side display position provided according to an embodiment of the present disclosure.

In one example, while determining the target on-screen comment at the target display position, the display content of the target display position may also be determined on the basis of the target on-screen comment at the target display position. With reference to FIG. 4, a specific process may be as follows:

the text content of the target on-screen comment may be directly determined to be the display content of the target display position when a length of the target display position is the same as a length of the target on-screen comment at the target display position.

When the length of the target display position is different from the length of the target on-screen comment at the target display position, when the length of the target display position is greater than the length of the target on-screen comment at the target display position, then the length of the text content of the target on-screen comment may be increased to be the same as the length of the target display position, and the text content of the increased target on-screen comment may be determined to be the display content of the target display position. Exemplarily, the target on-screen comment at the target display position may be copied (the length of the copied text content may be a difference value between the length of the target display position and the length of the target on-screen comment at the target display position), and the copied text content is spliced after or before the text content of the target on-screen comment at the target display position, and the display content of the target display position may be filled in this way until the display content of the target display position is fully filled.

When the length of the target display position is less than the length of the target on-screen comment at the target display position, then the text content of the target on-screen comment may be cropped to have the same as the length of the target display position, and the text content of the cropped target on-screen comment may be determined to be the display content of the target display position. Exemplarily, the target on-screen comment at the target display position is cropped, and the length of the cropped text content may be the difference value between the length of the target on-screen comment at the target display position and the length of the target display position. In some embodiments, the text content may be cropped starting from the head of the text content or from the tail of the text content. This is not limited in the embodiment of the present disclosure.

In this way, by determining the display content of the target display position at a server side, a terminal only needs to display the corresponding display content at each display position of the graphic without additionally executing a display content determination process, and thus, the amount of computation at a terminal side is reduced, and the computation pressure at the terminal side is reduced.

In some embodiments, after determining the plurality of target on-screen comments of the target word, the display time period of the plurality of target on-screen comments may be determined according to an average value of time-stamps of the plurality of target on-screen comments.

The timestamp of the target on-screen comment is an initial display time of the target on-screen comment during video playback, that is, a video playback time when the on-screen comment is displayed. After the on-screen comment is selected as the target on-screen comment, the target on-screen comment may be displayed according to a new initial display time. The new initial display time is the average value of the timestamps of the plurality of target on-screen comments, and the display time period of the plurality of target on-screen comments is a corresponding time period of the plurality of on-screen comments from the new initial display time to an end display time. Exemplarily, after the plurality of target on-screen comments are spliced, the plurality of target on-screen comments are displayed in the form of being combined into the graphic associated with the target word at a default speed starting from the new initial display time. In some embodiments, when the video includes the plurality of target words, the plurality of target on-screen comments corresponding to the plurality of target words are sequentially combined and displayed according to the time sequence of the new initial display times corresponding to the target words.

In one example, an on-screen comment sequence of the video may also be segmented to obtain the on-screen comment data set corresponding to different playback time periods, and then the target words, the target on-screen comments, and annotation information corresponding to the target on-screen comments are respectively determined from the on-screen comment data set corresponding to different playback time periods, and the specific process may be as follows: a playback duration of the video is segmented to obtain the plurality of playback time periods of the video; an on-screen comment data set corresponding to the plurality of playback time periods is acquired; and the plurality of target on-screen comments associated with the target words corresponding to the plurality of playback time periods are respectively selected from the on-screen comment data set corresponding to the plurality of playback time periods.

Figure 5:
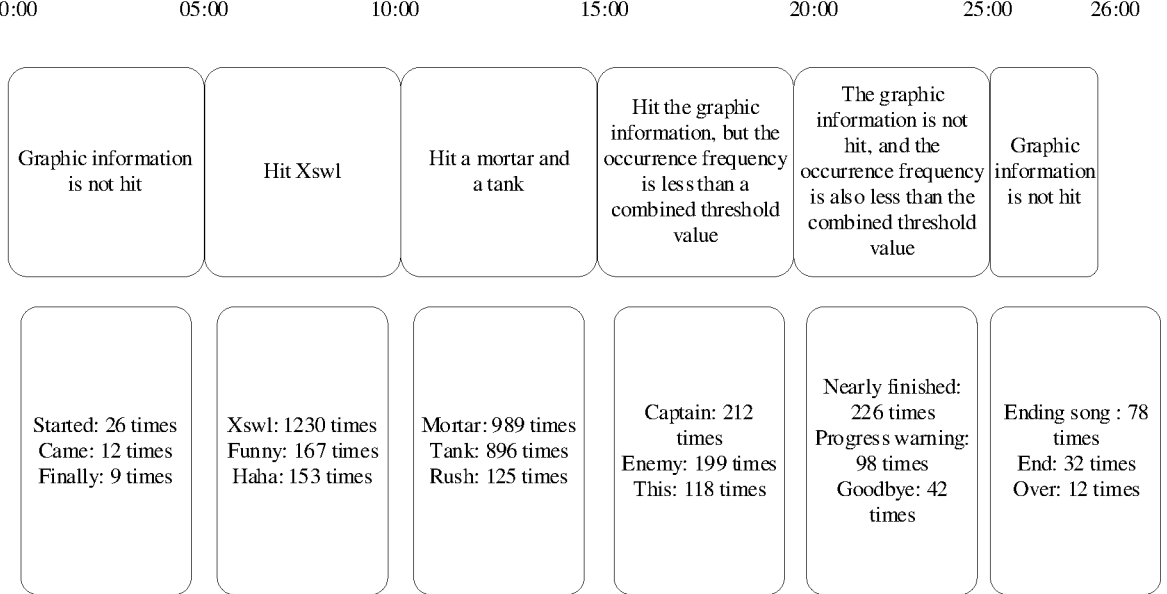
FIG. 5 is a schematic diagram of a playback time period provided according to an embodiment of the present disclosure.

For example, with reference to FIG. 5, the playback duration of the video is 26 minutes. The playback duration of the video is segmented according to the duration of five minutes, and the video segment of less than five minutes may be a segment, and the video may be segmented into six playback time periods which respectively are 00:00 to 05:00, 05:00 to 10:00, 10:00 to 15:00, 15:00 to 20:00, 20:00 to 25:00, and 25:00 to 26:00. The word data sets corresponding to the six playback time periods and the occurrence frequency of each word in the word data sets are collected, and the words with the occurrence frequencies being top three ranks are determined to be initial candidate words.

When the occurrence frequencies of the initial candidate words are less than the combined threshold value, or the initial candidate words do not hit the graphic information in the graphic information library, the initial candidate words may not be determined to be the target words. For example, within the playback time period from 00:00 to 05:00, the initial candidate words include: the word "started": 26 times, the word "came": 12 times, and the word "finally": 9 times. Assuming that the combined threshold value is 220 times, the occurrence frequencies of all initial candidate words are less than the combined threshold value, and no initial candidate words hit the graphic information in the graphic information library, then there is no target word in the playback time period from 00:00 to 05:00. For another example, within the playback time period from 25:00 to 26:00, the initial candidate words include: the word "ending song": 78 times, the word "ended": 32 times, and the word "over": 12 times, the occurrence frequencies of all initial candidate words are less than the combined threshold value, and when no initial candidate words hit the graphic information in the graphic information library, there is no target word in the playback time period from 25:00 to 26:00.

When the occurrence frequencies of the initial candidate words are greater than the combined threshold value, and the initial candidate words hit the graphic information in the graphic information library, the initial candidate words may be determined to be the target words. For example, within the playback time period from 05:00 to 10:00, the initial candidate words include: the word "Xswl": 1230 times, the word "funny": 167 times, and the word "haha": 153 times, the occurrence frequency of the word "Xswl" is greater than the combined threshold value, and the word "Xswl" hits the graphic information, then there is a target word in the playback time period from 05:00 to 10:00, thus the target on-screen corresponding to the word "Xswl" is determined on the basis of the graphic information of the word "Xswl", and the annotation information of the target on-screen comment is generated. For another example, within the playback time period from 10:00 to 15:00, the initial candidate words include: the word "mortar": 989 times, the word "tank": 896 times, and the word "rush": 125 times, the occurrence frequencies of the words "mortar" and "tank" are greater than the combined threshold value, and the words "mortar" and "tank" both hit the graphic information in the graphic information library, so there are target words in the playback time period from 10:00 to 15:00, and thus the target on-screen comments corresponding to the words "mortar" and "tank" are respectively determined according to the graphic information of the words "mortar" and "tank", and the annotation information of the target on-screen comments is generated.

When the initial candidate word hits the graphic information in the graphic information library, but the occurrence frequency of the initial candidate word is less than the combined threshold value, the initial candidate word may not be determined to be the target word. For example, within the playback time period from 15:00 to 20:00, the initial candidate words include: the word "captain": 212 times, the word "enemy": 199 times, and the word "this . . . ": 118 times, only the word "captain" hits the graphic information in the graphic information library, but the occurrence frequency thereof is less than the combined threshold value, then there is no target word in the playback time period from 15:00 to 20:00.

When the occurrence frequency of the initial candidate word is greater than the combined threshold value, but the initial candidate word does not hit the graphic information in the graphic information library, the initial candidate word may not be determined to be the target word. For example, within the playback time period from 20:00 to 25:00, the initial candidate words include: the word "nearly finished":

226 times, the word "progress warning": 98 times, and the word "goodbye": 42 times, only the occurrence frequency of the word "nearly finished" is greater than the combined threshold value, but the word does not hit the graphic information in the graphic information library, then there is no target word in the playback time period from 20:00 to 25:00.

Step 203: Generate annotation information corresponding to the plurality of target on-screen comments, the annotation information indicating information related to combine and display the plurality of target on-screen comments to form a graphic associated with the target word.

In one example, the generation process of the annotation information may be as follows: the position information of a target display position in the plurality of display positions is acquired, and the position information is used for indicating a position of the target display position in the graphic; and the annotation information corresponding to the target on-screen comment displayed at the target display position is generated on the basis of the position information of the target display position.

For example, when a first display position of the "tank" graphic corresponding to the target word "tank" is annotated as tank 1, and a second display position is annotated as tank 2, the annotation content of the tank 1 may be added to the annotation information of the target on-screen comment displayed at the first display position to indicate that the target on-screen comment is located at the first display position of the "tank" graphic, the annotation content of the tank 2 may be added to the annotation information of the target on-screen comment displayed at the second display position to indicate that the target on-screen comment is located at the second display position of the "tank" graphic, and the annotations of all target on-screen comments corresponding to the target words are sequentially completed to generate the annotation information of all target on-screen comments.

In one example, an updated on-screen comment data set is acquired in response to that the quantity of newly added on-screen comments of the video is greater than or equal to a first threshold value; a plurality of updated target on-screen comments associated with an updated target word are selected from the updated on-screen comment data set; and annotation information corresponding to the plurality of updated target on-screen comments are generated.

The first threshold value may be dynamically set according to actual requirements. For example, when there are a large number of newly added on-screen comments, the first threshold value may be appropriately increased, such as increasing the first threshold value by 10%, 15% and the like of the original value. In some embodiments, when there are a relatively small number of newly added on-screen comments, the first threshold value may be appropriately reduced. The acquisition methods for the updated target words, the updated target on-screen comments, and the updated annotation information are the same as those described above, and details are not described herein again.

Figure 6:
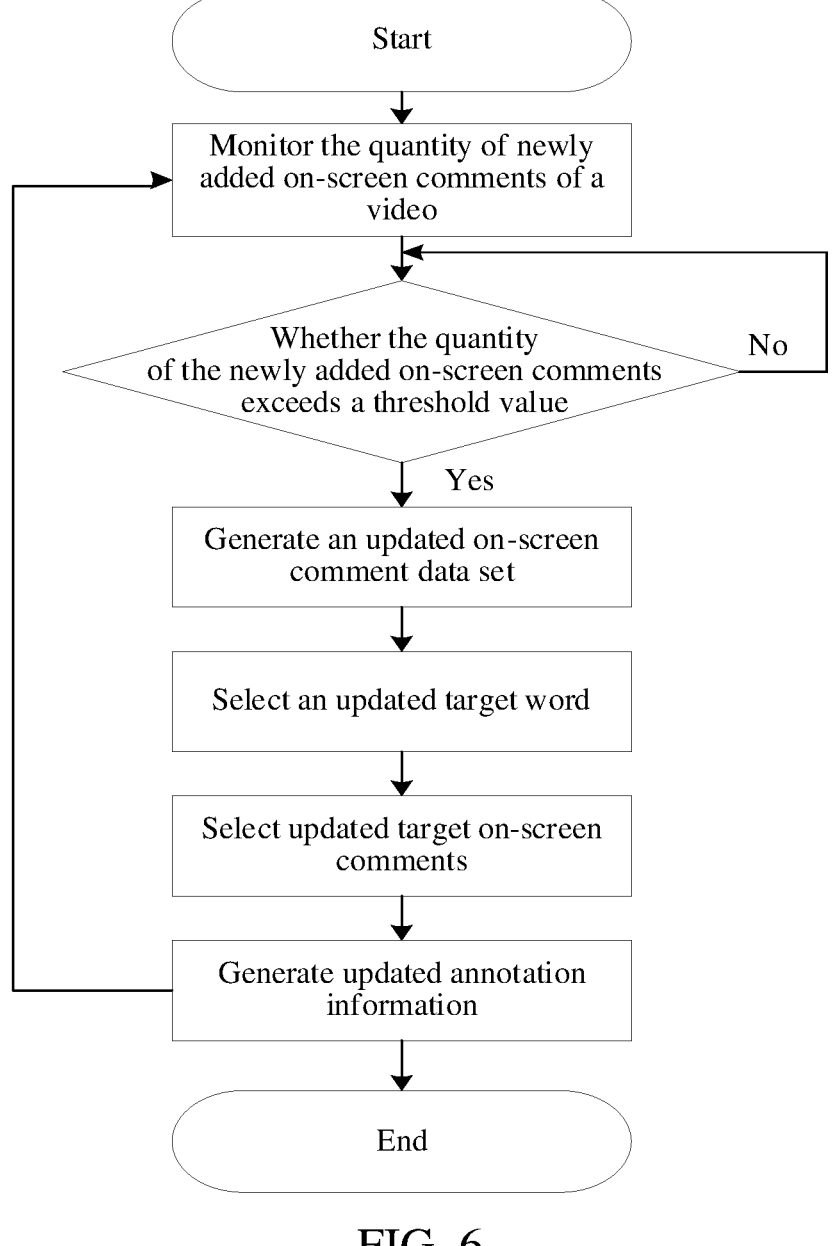
FIG. 6 is a flowchart of a method for updating annotation information provided according to an embodiment of the present disclosure.

For example, with reference to FIG. 6, the quantity of newly added on-screen comments in the video is monitored. When the quantity of newly added on-screen comments exceeds a threshold value (i.e., the first threshold value), then all the on-screen comments in the video are pulled, and an updated on-screen comment data set is generated. An updated target word is selected from the updated on-screen comment data set; then a plurality of updated target on-screen comments are selected for the updated target word, and finally, annotation information, i.e., updated annotation information, corresponding to the updated target on-screen comments is generated. When the quantity of newly added on-screen comments does not exceed the threshold value (that is, the first threshold value), then it is continued to monitor the quantity of newly added on-screen comments in the video.

In some embodiments, the quantity of newly added on-screen comments within different playback time periods may also be measured on the basis of the foregoing playback time periods, and when the quantity of newly added on-screen comments within a certain playback time period is greater than the first threshold value, the target word, the target on-screen comment, and the annotation information within the playback time period may be updated separately, so that the server does not need to update the target words, the target on-screen comments, and the annotation information within all playback time periods, and thus, the amount of computation of the server is reduced and the operating pressure of the server is reduced.

In one feasible example, the server only needs to determine the graphic information corresponding to the video, and then the terminal determines the target on-screen comment according to the graphic information, and displays the target on-screen comment according to the graphic information. The determination process of the graphic information may be as follows:

the on-screen comment data set of the video is acquired. Word segmentation is performed on the on-screen comments in the on-screen comment data set to obtain a word data set. Screening is performed on the word data set according to an occurrence frequency of each word in the word data set to obtain a candidate word set. When a graphic information library includes graphic information corresponding to a target candidate word in the candidate word set, the target candidate word is determined to be the target word and the graphic information is determined to be the graphic information corresponding to the video.

In some embodiments, with reference to FIG. 7, the update process of graphic information may be as follows: the quantity of newly added on-screen comments in the video is monitored, and when the quantity of newly added on-screen comments exceeds the threshold value (i.e., the first threshold value), then all on-screen comments in the video are pulled and the updated on-screen comment data set is generated. The updated target word is selected from the updated on-screen comment data set, and the graphic information corresponding to the updated target word is determined to be the updated graphic information corresponding to the video. When the quantity of newly added on-screen comments does not exceed the threshold value (that is, the first threshold value), then it is continued to monitor the quantity of newly added on-screen comments in the video.

Hence, according to the technical solution provided by the embodiment of the present disclosure, by generating the annotation information for instructing to combine the plurality of target on-screen comments to form the graphic associated with the target word, the plurality of target on-screen comments associated with the target word are combined and displayed according to the annotation information on the basis of the graphic corresponding to the target word in the process of displaying the on-screen comments, and thus, the display manner of the on-screen comment is enriched and the diversity and display effect of on-screen comment display are improved.

In addition, the video is segmented to determine the target words, the target on-screen comments and the annotation information within each playback time period, and adjust the display time period of the target on-screen comments within a small range, so that it is avoided that the display time line of the on-screen comments of the video is completely disordered, and thus, the matching of the target on-screen comments and playback content is ensured, and the display effect of the target on-screen comments is ensured. Moreover, a corresponding interface of the graphic information library only needs to be called once within a playback time period, so that it is avoided that the corresponding interface of the graphic information library is repeatedly called, and thus, the workload of the server is reduced.

In addition, by determining the target on-screen comment and the annotation information (such as the display position and the display time period) of the target on-screen comment at the server side, a client only needs to perform display according to the annotation information of the target on-screen comment, i.e., the plurality of target on-screen comments may be combined and displayed to form the graphic associated with the target word, so that it is avoided that each client performs the selection process of the target on-screen comment and the determination process of the annotation information once, and thus, the amount of computation of the client is reduced and the running pressure of the client is reduced.

In addition, when the server determines the target on-screen comment corresponding to the video, and the display form and annotation information of the target on-screen comment, the terminal does not need to additionally execute the determination process of the display content, and thus, the amount of computation at the terminal side is reduced, and the computation pressure at the terminal side is reduced. When the terminal determines the target on-screen comment corresponding to the video, and the display form and annotation information of the target on-screen comment, different terminals may flexibly determine different on-screen comment combination manners, and do not need to uniformly perform on-screen comment display according to an on-screen comment combination manner provided by the server, and thus, the flexibility and diversity of on-screen comment combination are improved and the display manner of the on-screen comment is further enriched.

Figures 7, 8:
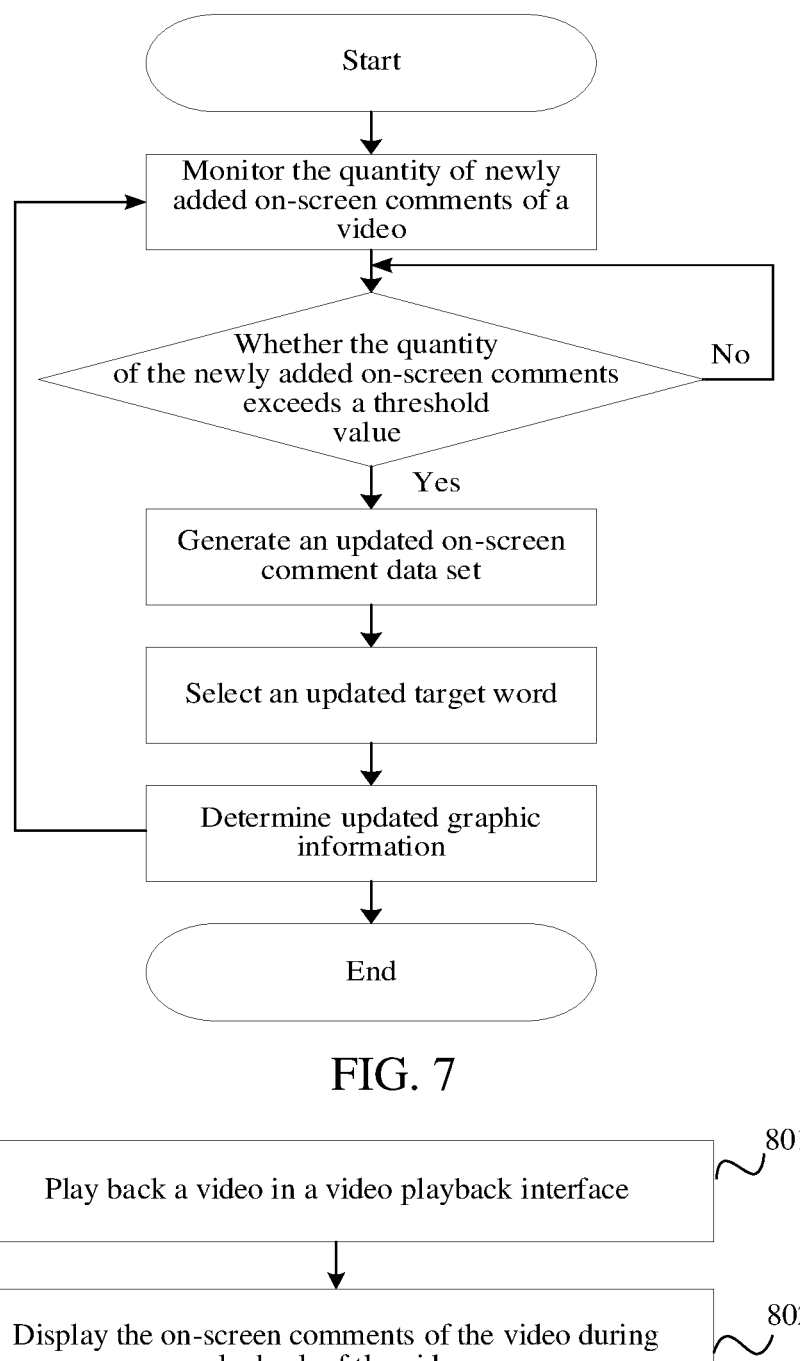
FIG. 7 is a flowchart of a method for updating graphic information corresponding to a target video provided according to an embodiment of the present disclosure.
FIG. 8 is a flowchart of an on-screen comment display method provided according to another embodiment of the present disclosure.

With reference to FIG. 8, FIG. 8 is a flowchart of an on-screen comment display method provided by another embodiment of the present disclosure. The execution subject of each step of the method may be the terminal described above (a terminal 11 in the solution implementation environment shown in FIG. 1). For example, each step may be executed by a client of a target application (such as a video playback application) installed and running in the terminal. The method may include the following steps (801 to 803).

Step 801: Play back a video in a video playback interface.

The video playback interface is an interface used for displaying the playback content of the video, and may also display the on-screen comment of the video. In some embodiments, in response to a playback operation of a user for the video, the client sends a resource acquisition request to a server to acquire a video resource, an on-screen comment resource and the like of the video, and the client plays back the video according to the video resource, i.e., displaying the playback content of the video in the video playback interface. The client plays back the on-screen comment of the video according to the on-screen comment resource, i.e., displaying the on-screen comment of the video in the video playback interface.

Step 802: Display an on-screen comment of the video during playback of the video.

In some embodiments, the on-screen comment of the video is displayed in a specific area of the video playback interface. For example, in the specific area of the video playback interface, the on-screen comment of the video is scrolled and displayed from right to left at a set speed.

Step 803: Combine and display, within a target playback time period of the video, a plurality of target on-screen comments associated with a target word to form a graphic associated with the target word.

In the embodiment of the present disclosure, the target word is selected from the text content of the on-screen comments of the video, and the text content of the target on-screen comments may include the target word, and may also include words having the identical or similar semantic meaning to the target word. The specific description of the target word and the target on-screen comment is the same as that of the foregoing embodiment, and details are not described herein again.

The graphic associated with the target word may be a simplified graphic of the content of a picture selected by a designer for the target word, and the graphic may be outlined by using the main edge lines corresponding to the content of the picture. The vector position information and length information of the main edge lines and the main edge lines may be determined by using the edge search technology of picture processing.

The target playback time period is a time period from a starting display time of the plurality of target on-screen comments to an end display time of the plurality of target on-screen comments. The starting display time of the target playback time period is determined according to an average value of timestamps of the plurality of target on-screen comments. The starting display time of the target playback time period is the starting display time of the plurality of target on-screen comments, and the end time of the target playback time period is the end display time of the plurality of target on-screen comments.

Figure 9:
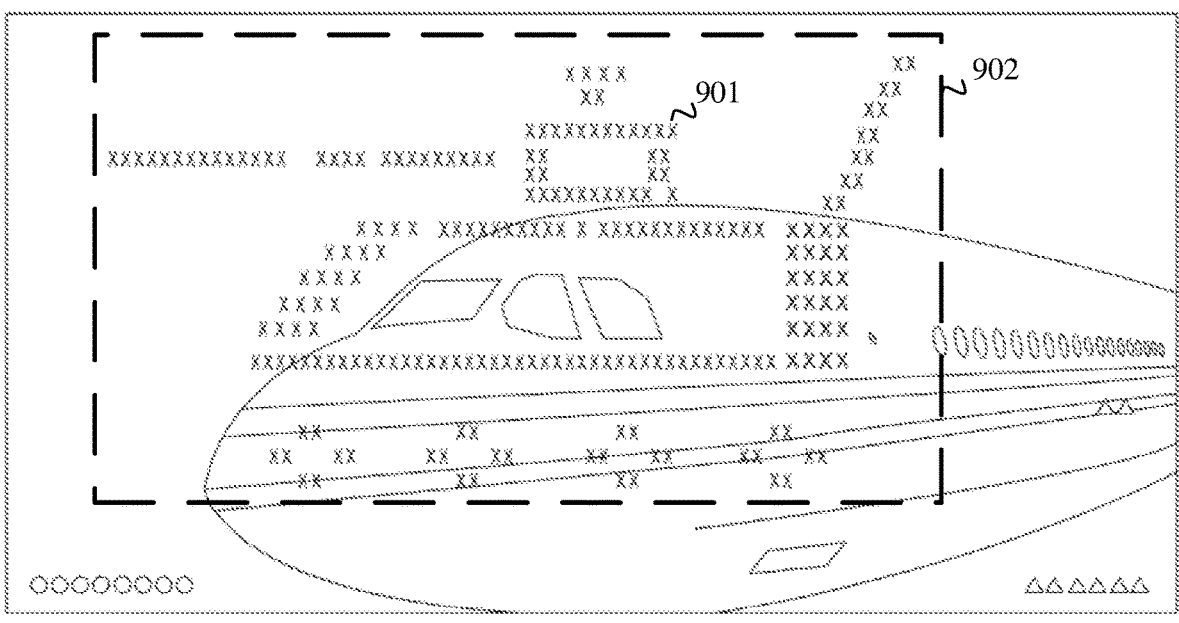
FIG. 9 is a schematic diagram of combining and displaying a target on-screen comment provided according to an embodiment of the present disclosure.

Exemplarily, with reference to FIG. 9, within a target playback time period, a target word is "tank", target on-screen comments are on-screen comments carrying the target word "tank", and a plurality of target on-screen comments are combined and displayed to form a "tank" graphic 901 associated with the target word "tank".

In one example, after acquiring an on-screen comment resource of a video, a client starts to acquire the target on-screen comments and splice the target on-screen comments according to the on-screen comment data set and annotation information in the on-screen comment resource to combine and display the plurality of target on-screen comments within the target playback time period. The specific content may be as follows: respective annotation information of the plurality of target on-screen comments is acquired, and the annotation information is used for indicating display positions of the target on-screen comments in the graphic; the display positions of the plurality of the target on-screen comments in the graphic are determined according to the respective annotation information of the plurality of target on-screen comments; and the plurality of target on-screen comments are displayed according to the display positions of the plurality of target on-screen comments within the target playback time period of the video.

In a feasible example, the client may select and locate the target on-screen comment by itself according to the target word and the graphic information corresponding to the target word. And the specific content may be as follows: the graphic information of the target word is acquired, the graphic information is used for indicating the graphic; the plurality of display positions corresponding to the target word are determined according to the graphic information of the target word, and each display position is used for displaying the target on-screen comment; lengths of the plurality of display positions and lengths of the plurality of target on-screen comments are performed matching, and the display positions of the plurality of target on-screen comments in the graphic are determined; and the plurality of target on-screen comments are displayed according to the display position of the plurality of target on-screen comments in the graphic within the target playback time period of the video.

The graphic information includes the position information and length information of each display position. Each display position is a main edge line above. The vector position information of the main edge line is the position information of the display position, and the length information of the main edge line is the length information of the display position.

In some embodiments, when the client selects and locates the target on-screen comments by itself, the on-screen comments of the video may be rendered according to an asynchronous rendering method, and the selection and location process of the target on-screen comments may be implemented by a sub-thread, and thus, it may be avoided that a main thread is blocked, and the viewing experience of a user is ensured. After selecting and locating the target on-screen comments, the plurality of target on-screen comments may be spliced, and the starting display time of the graphic may be synchronously calculated. For example, when there are a plurality of target words, the plurality of target on-screen comments corresponding to each target word are displayed successively in an ascending order according to the average value of the timestamps of the plurality of target on-screen comments corresponding to each target word.

In one example, the display method of the target on-screen comment at each display position may be as follows:

a first target on-screen comment is overlaid and displayed at the display position of the first target on-screen comment in the graphic when a length of the first target on-screen comment is equal to a length of the display position of the first target on-screen comment in the graphic, where the first target on-screen comment is one of the plurality of target on-screen comments. For example, when the text content of the first target on-screen comment is "123456" and the length of the display position of the first target on-screen comment in the graphic is 6, then display content at the display position of the first target on-screen comment in the graphic is "123456".

The first target on-screen comment is copied and displayed at the display position of the first target on-screen comment in the graphic when the length of the first target on-screen comment is less than the length of the display position of the first target on-screen comment in the graphic. For example, when the text content of the first target on-screen comment is "123456" and the length of the display position of the first target on-screen comment in the graphic is 8, then the display content at the display position of the first target on-screen comment in the graphic is "123456"+"12". In some embodiments, when the target word corresponding to the first target on-screen comment is "34", then the display content at the display position of the first target on-screen comment in the graphic may be "123456"+"34".

The first target on-screen comment is cropped and displayed at the display position of the first target on-screen comment in the graphic when the length of the first target on-screen comment is greater than the length of the display position of the first target on-screen comment in the graphic. For example, when the text content of the first target on-screen comment is "123456" and the length of the display position of the first target on-screen comment in the graphic is 4, then the display content at the display position of the first target on-screen comment in the graphic is "1234".

In some embodiments, the user may also filter the on-screen comment by turning on an on-screen comment filtering function. Exemplarily, the specific content may be as follows: a filtering coefficient is determined in response to a trigger operation for an on-screen comment filtering control, and the filtering coefficient is used for indicating a filtering proportion of the on-screen comments having the same text content; and the on-screen comments of the video are filtered according to the filtering coefficient, where in the on-screen comments of the video, the on-screen comments other than the target on-screen comments are filtered according to the filtering coefficient.

Figure 10:
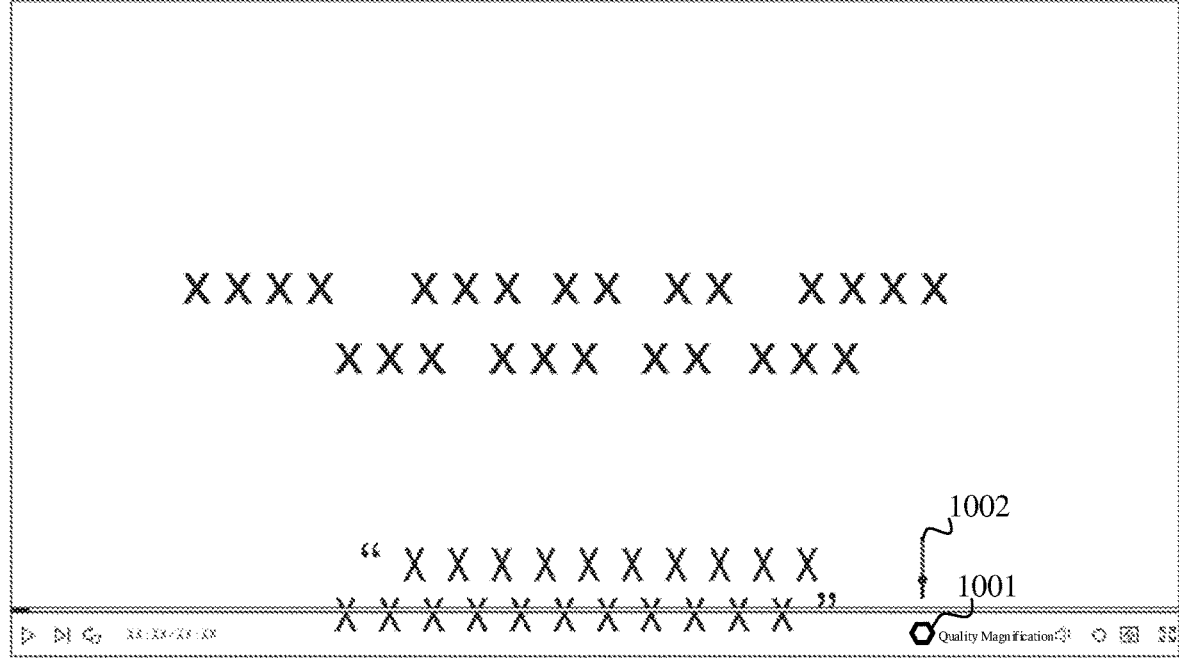
FIG. 10 is a schematic diagram of filtering an on-screen comment provided according to an embodiment of the present disclosure.

For example, with reference to FIG. 10, in response to a trigger operation of a user for an on-screen comment filtering control 1001, a client turns on an on-screen comment filtering function and displays a filtering coefficient adjustment control 1002. By sliding the filtering coefficient adjustment control 1002, an on-screen comment filtering coefficient may be set to adjust a filtering proportion of on-screen comments having the same text content. The smaller the filtering coefficient is, the smaller the filtering proportion of the on-screen comments having the same text content is, that is, the lower an occurrence frequency of the on-screen comments having the same text content is. For example, assuming that a range of the filtering coefficient is [0, 1], when there are 100 on-screen comments having the same text content within a certain playback time period, and the filtering coefficient is set to be 0.5, only 50 on-screen comments having this text content are displayed randomly within the playback time period, and other on-screen comments having the same text content are not be rendered on a screen.

In some embodiments, within the target playback time period, in response to the trigger operation of the user for the on-screen comment filtering control, the client only filters the on-screen comments other than the target on-screen comments. For example, the client first removes the target on-screen comments from an on-screen comment data set corresponding to the target playback time period, and then filters the remaining on-screen comments according to the filtering coefficient. The target on-screen comments are not filtered to ensure the integrity of graphic display.

In some embodiments, when the user does not turn on the on-screen comment filtering function within the target playback time period, at least one on-screen comment other than the target on-screen comments is displayed outside a safety range based on the graphic. That is, no on-screen comment other than the target on-screen comments is displayed within the safety range based on the graphic. The on-screen comments other than the target on-screen comments may be randomly distributed outside the safety range, and the other on-screen comments may include: an on-screen comment that does not include the target word, a candidate on-screen comment that includes the target word but does not participate in graphic combination, and a new on-screen comment issued by the user, etc. In this way, it may be avoided that other on-screen comments affect a combination effect of the target on-screen comments. The safety range may be adaptively set and modified without affecting the combination effect of the target on-screen comments, and the size of the safety range may be positively correlated with the size of a display screen of a terminal. Exemplarily, a range within which a distance between the graphics is less than or equal to 100 pixels may be set as the safety range, and a range of a regular shape based on the graphic may also be set as the safety range. This is not limited in the embodiment of the present disclosure. For example, with reference to FIG. 9, no on-screen comment other than the target on-screen comments is displayed within a safety range 902 based on a "tank" graphic 901.

During playback of the video, when the user sends a new on-screen comment, the client normally displays the new on-screen comment, and when the client autonomously selects the target on-screen comments, the client does not use the new on-screen comment as the target on-screen comment, that is, the new on-screen comment does not participate in the splicing of the graphic of the target word. Moreover, the new on-screen comment is not affected by the on-screen comment filtering function, and may be directly displayed on the screen. Only when the user watches the video again, the new on-screen comment may participate in the splicing of the graphic of the target word.

Hence, according to the technical solution provided by the embodiment of the present disclosure, by generating the annotation information for instructing to combine and display the plurality of target on-screen comments to form the graphic associated with the target word, the plurality of target on-screen comments associated with the target word are combined and displayed according to the annotation information on the basis of the graphic corresponding to the target word in the process of displaying the on-screen comments, and thus, the display manner of the on-screen comment is enriched and the diversity and display effect of on-screen comment display are improved.

In addition, by setting the on-screen comment filtering control to control the occurrence frequency of the on-screen comment having the same text content, a large number of repeated on-screen comments may be filtered out while ensuring that the user may acquire rich on-screen comment content, so that it is avoided that the playback content is blocked due to too many on-screen comments, and thus, the viewing experience of the user is improved.

The apparatus embodiments of the present disclosure are described below, and may be used for executing the method embodiments of the present disclosure. For details that are not described in the apparatus embodiments of the present disclosure, refer to the method embodiments of the present disclosure.

Figure 11:
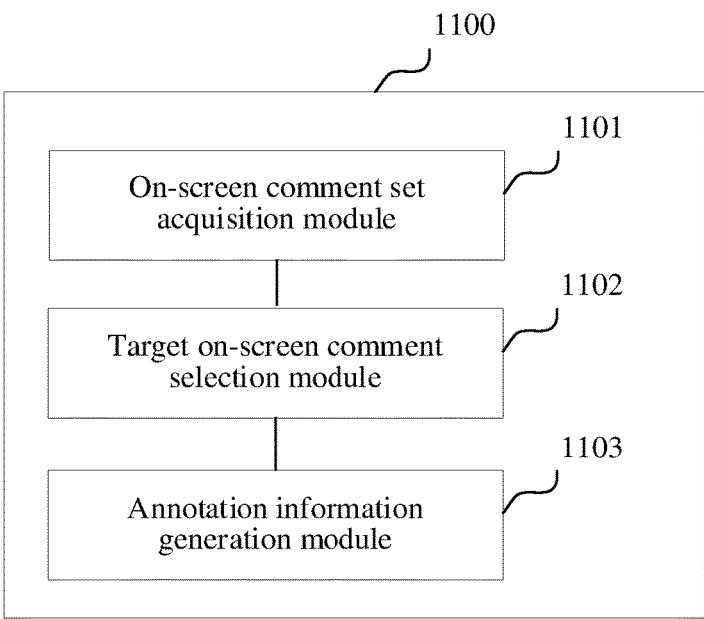
FIG. 11 is a block diagram of an on-screen comment display apparatus provided according to an embodiment of the present disclosure.

With reference to FIG. 11, FIG. 11 is a block diagram of an on-screen comment display apparatus provided according to an embodiment of the present disclosure. The apparatus has functions of implementing the foregoing method embodiments, and the functions may be implemented by hardware or may be implemented by hardware executing corresponding software. The apparatus may be a server or may be provided in the server. The apparatus 1100 may include: an on-screen comment set acquisition module 1101, a target on-screen comment selection module 1102, and an annotation information generation module 1103.

The on-screen comment set acquisition module 1101 is configured to acquire an on-screen comment data set of a video, the on-screen comment data set including at least one on-screen comment.

The target on-screen comment selection module 1102 is configured to select, from the on-screen comment data set, a plurality of target on-screen comments associated with a target word.

The annotation information generation module 1103 is configured to generate annotation information corresponding to the plurality of target on-screen comments, the annotation information indicating information related to combine and display the plurality of target on-screen comments to form a graphic associated with the target word.

Figure 12:
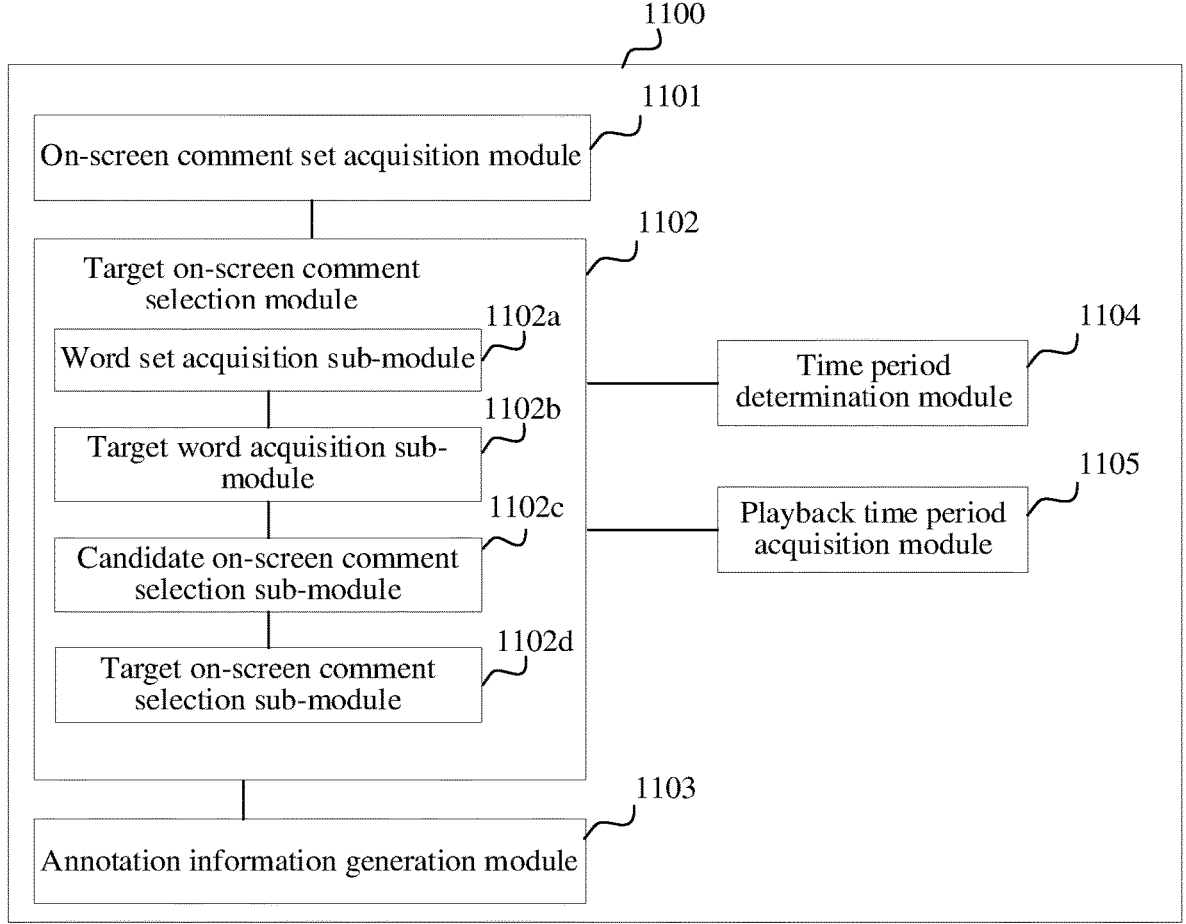
FIG. 12 is a block diagram of an on-screen comment display apparatus provided according to another embodiment of the present disclosure.

In one exemplary embodiment, as shown in FIG. 12, the target on-screen comment selection module 1102 includes: a word set acquisition sub-module 1102a, a target word acquisition sub-module 1102b, a candidate on-screen comment selection sub-module 1102c and a target on-screen comment selection sub-module 1102d.

The word set acquisition sub-module 1102a is configured to perform word segmentation on on-screen comments in the on-screen comment data set to obtain a word data set.

The target word acquisition sub-module 1102b is configured to select the target word from the word data set.

The candidate on-screen comment selection sub-module 1102c is configured to select, from the on-screen comment data set, on-screen comments associated with the target word to generate a candidate on-screen comment set.

The target on-screen comment selection sub-module 1102d is configured to select the plurality of target on-screen comments from the candidate on-screen comment set.

In one exemplary embodiment, the target word acquisition sub-module 1102b is configured to:

perform screening on the word data set according to an occurrence frequency of each word in the word data set to obtain a candidate word set; and determine, when there is graphic information, in a graphic information library, corresponding to a target candidate word in the candidate word set, the target candidate word to be the target word, where the graphic information is used for indicating the graphic associated with the target word.

In one exemplary embodiment, the target on-screen comment selection sub-module 1102d is configured to:

determine a plurality of display positions corresponding to the target word according to the graphic information of the target word, where the display positions are used for displaying the target on-screen comments; and sequentially select, according to a descending order of lengths of the display positions, the target on-screen comments of the display positions from the candidate on-screen comment set.

In one exemplary embodiment, there are m display positions corresponding to the target word, and m is a positive integer.

The target on-screen comment selection sub-module 1102d is further configured to determine, according to a length of an ith display position in the m display positions and a length of each candidate on-screen comment in the candidate on-screen comment set, a target on-screen comment displayed at the ith display position, where i is a positive integer with a starting value of 1, and the length of the ith display position is greater than or equal to a length of a (i+1)th display position;

remove the target on-screen comment of the ith display position from the candidate on-screen comment set; and enable, when i is less than m, i to be equal to i plus 1, and continue execution starting from an operation of determining, according to a length of an ith display position in the m display positions and a length of each candidate on-screen comment in the candidate on-screen comment set, the target on-screen comment at the ith display position.

In one exemplary embodiment, the annotation information generation module 1103 is configured to:

acquire position information of a target display position in the plurality of display positions, the position information being used for indicating a position of the target display position in the graphic; and generate, according to the position information of the target display position, the annotation information corresponding to the target on-screen comment displayed at the target display position.

In one exemplary embodiment, as shown in FIG. 12, the apparatus 1100 further includes a time period determination module 1104.

The time period determination module 1104 is configured to determine a display time period of the plurality of target on-screen comments according to an average value of timestamps of the plurality of target on-screen comments.

In one exemplary embodiment, as shown in FIG. 12, the apparatus 1100 further includes a playback time period acquisition module 1105.

The playback time period acquisition module 1105 is configured to segment a playback duration of the video to obtain a plurality of playback time periods of the video.

The on-screen comment set acquisition module 1101 is further configured to acquire an on-screen comment data set corresponding to the plurality of playback time periods.

The target on-screen comment selection module 1102 is further configured to respectively select, from the on-screen comment data set corresponding to the plurality of playback time periods, the plurality of target on-screen comments associated with the target word corresponding to the plurality of playback time periods.

In one exemplary embodiment, the on-screen comment set acquisition module 1101 is further configured to acquire, in response to that the quantity of newly added on-screen comments of the video is greater than or equal to a first threshold value, an updated on-screen comment data set.

The target on-screen comment selection module 1102 is further configured to select, from the updated on-screen comment data set, a plurality of updated target on-screen comments associated with an updated target word.

The annotation information generation module 1103 is further configured to generate annotation information corresponding to the plurality of updated target on-screen comments.

Hence, according to the technical solution provided by the embodiment of the present disclosure, by generating the annotation information for instructing to combine and display the plurality of target on-screen comments to form the graphic associated with the target word, the plurality of target on-screen comments associated with the target word are combined and displayed according to the annotation information on the basis of the graphic corresponding to the target word in the process of displaying the on-screen comments, and thus, the display manner of the on-screen comments is enriched and the diversity and display effect of on-screen comment display are improved. Moreover, a user may participate in the splicing and combination of the graphic by sending on-screen comments, thereby improving the interest in the process of watching the video.

Figures 13, 14:
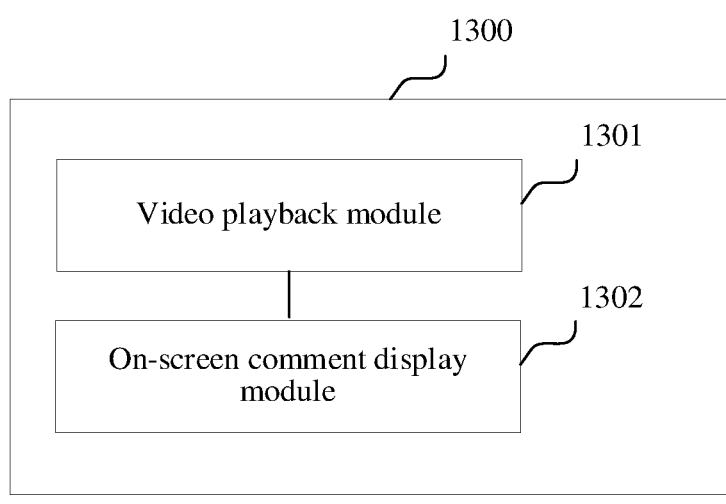
FIG. 13 is a block diagram of an on-screen comment display apparatus provided according to another embodiment of the present disclosure.
FIG. 14 is a structural block diagram of a terminal provided according to an embodiment of the present disclosure.

With reference to FIG. 13, FIG. 13 is a block diagram of an on-screen comment display apparatus provided according to an embodiment of the present disclosure. The apparatus has functions of implementing the foregoing method embodiments, and the functions may be implemented by hardware or may be implemented by hardware executing corresponding software. The apparatus may be a terminal or may be provided in the terminal. The apparatus 1300 may include a video playback module 1301 and an on-screen comment display module 1302.

The video playback module 1301 is configured to play back a video in a video playback interface.

The on-screen comment display module 1302 is configured to display on-screen comments of the video during playback of the video.

The on-screen comment display module 1302 is further configured to combine and display, within a target playback time period of the video, a plurality of target on-screen comments associated with a target word to form a graphic associated with the target word.

In one exemplary embodiment, the on-screen comment display module 1302 is configured to:

acquire respective annotation information of the plurality of target on-screen comments, the annotation information being used for indicating display positions of the target on-screen comments in the graphic;

determine the display positions of the plurality of the target on-screen comments in the graphic according to the respective annotation information of the plurality of target on-screen comments; and display, within the target playback time period of the video, the plurality of target on-screen comments according to the display positions of the plurality of target on-screen comments in the graphic.

In one exemplary embodiment, the on-screen comment display module 1302 is further configured to:

acquire graphic information of the target word, the graphic information being used for indicating the graphic;

determine a plurality of display positions corresponding to the target word according to the graphic information of the target word, the display positions being used for displaying the target on-screen comments;

perform matching on lengths of the plurality of display positions and lengths of the plurality of target on-screen comments, and determine the display positions of the plurality of target on-screen comments in the graphic; and display, within the target playback time period of the video, the plurality of target on-screen comments according to the display positions of the plurality of target on-screen comments in the graphic.

In one exemplary embodiment, the on-screen comment display module 1302 is further configured to:

overlay and display, when a length of a first target on-screen comment is equal to a length of a display position of the first target on-screen comment in the graphic, the first target on-screen comment at the display position of the first target on-screen comment in the graphic;

or copy and display, when the length of the first target on-screen comment is less than the length of the display position of the first target on-screen comment in the graphic, the first target on-screen comment at the display position of the first target on-screen comment in the graphic;

or crop and display, when the length of the first target on-screen comment is greater than the length of the display position of the first target on-screen comment in the graphic, the first target on-screen comment at the display position of the first target on-screen comment in the graphic, where the first target on-screen comment is one of the plurality of target on-screen comments.

In one exemplary embodiment, the apparatus 1300 further includes: an on-screen comment filtering module (not shown).

The on-screen comment filtering module is configured to determine, in response to a trigger operation for an on-screen comment filtering control, a filtering coefficient, the filtering coefficient being used for indicating a filtering proportion of the on-screen comments having the same text content; and filter the on-screen comments of the video according to the filtering coefficient, where in the on-screen comments of the video, the on-screen comments other than the target on-screen comments are filtered according to the filtering coefficient.

In one exemplary embodiment, the on-screen comment display module 1302 is further configured to display at least one on-screen comment other than the target on-screen comments outside the safety range based on the graphic.

Hence, according to the technical solution provided by the embodiment of the present disclosure, by generating the annotation information for instructing to combine and display the plurality of target on-screen comments to form the graphic associated with the target word, the plurality of target on-screen comments associated with the target word are combined and displayed according to the annotation information on the basis of the graphic corresponding to the target word in the process of displaying the on-screen comments, and thus, the display manner of the on-screen comments is enriched and the diversity and display effect of on-screen comment display are improved.

According to the apparatus provided in the aforementioned embodiments, when implementing the functions thereof, only division of the aforementioned function modules is used as an example for description. In practical application, the aforementioned functions may be allocated and implemented by different function modules according to requirements. That is, the content structure of a device is divided into different function modules to implement all or some of the aforementioned functions. In addition, the apparatus provided in the aforementioned embodiments and the method embodiments belong to the same concept. Please refer to the method embodiments for the specific implementation process, and details are not described herein again.

With reference to FIG. 14, FIG. 14 is a structural block diagram of a terminal 1400 provided according to an embodiment of the present disclosure. The terminal 1400 may be a terminal 11 in a solution implementation environment shown in FIG. 1. The terminal 1400 may be configured to implement the on-screen comment display method on the foregoing terminal side. Specifically, the terminal 1400 generally includes a processor 1401 and a memory 1402.

The processor 1401 may include one or more processing cores, for example, a 4-core processor or an 8-core processor. The processor 1401 may be implemented in at least one hardware form of a digital signal processor (DSP), a field-programmable gate array (FPGA), and a programmable logic array (PLA). The processor 1401 may also include a main processor and a coprocessor. The main processor is a processor configured to process data in a wakeup state, and is also referred to as a central processing unit (CPU). The coprocessor is a low-power-consumption processor config- ured to process data in a standby state. In some embodi- ments, the processor 1401 may be integrated with a graphics processing unit (GPU). The GPU is configured to render and draw content that needs to be displayed on a display screen. In some embodiments, the processor 1401 may further include an artificial intelligence (AI) processor. The AI processor is configured to process computing operations related to machine learning.

The memory 1402 may include one or more computer- readable storage media. The computer-readable storage medium may be non-transient. The memory 1402 may further include a high-speed random access memory and a nonvolatile memory, for example, one or more disk storage devices or flash storage devices. In some embodiments, the non-transient computer-readable storage medium in the memory 1402 is configured to store at least one instruction, at least one program, and a code set or an instruction set, and the at least one instruction, the at least one program, and the code set or the instruction set are loaded and executed by the processor to implement the on-screen comment display method at the foregoing terminal side.

In some embodiments, the terminal 1400 may include a peripheral device interface 1403 and at least one peripheral device. The processor 1401, the memory 1402, and the peripheral device interface 1403 may be connected by means of a bus or a signal cable. Each peripheral device may be connected to the peripheral device interface 1403 by means of the bus, the signal cable, or a circuit board. Specifically, the peripheral device includes: at least one of a radio frequency circuit 1404, a display screen 1405, a camera component 1406, an audio circuit 1407, a position- ing component 1408, and a power supply 1409.

Persons skilled in the art may understand that the structure shown in FIG. 14 does not limit the terminal 1400, and may include more or fewer components than those shown in the figures, or some components may be combined, or different component deployment may be used.

Figure 15:
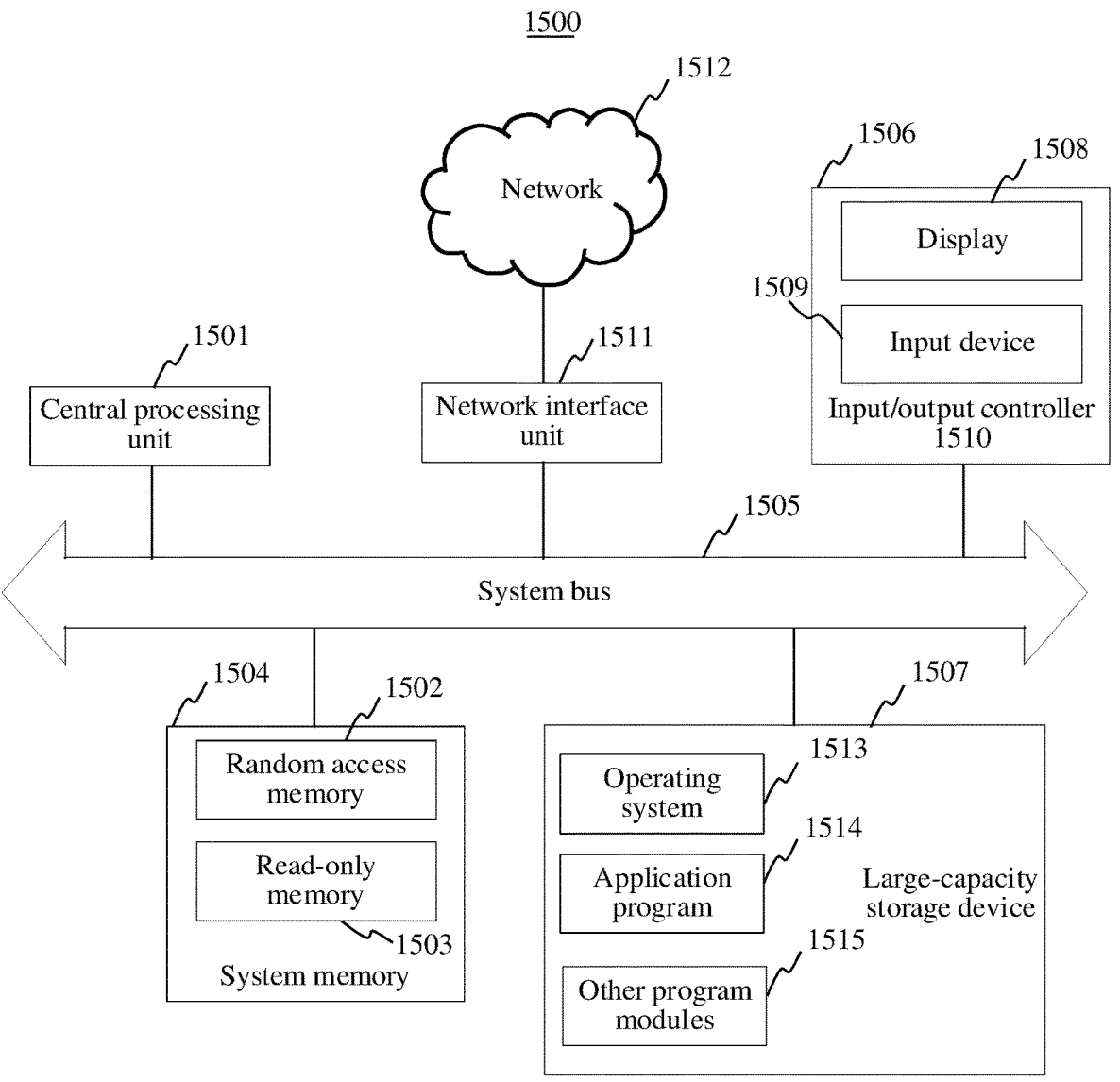
FIG. 15 is a structural block diagram of a server provided according to an embodiment of the present disclosure.

With reference to FIG. 15, FIG. 15 is a structural block diagram of a server provided according to an embodiment of the present disclosure. The server 1500 may be the server 12 in the solution implementation environment shown in FIG. 1. The server may be configured to implement the on-screen comment display method provided in the foregoing embodi- ments. Specifically, the server 1500 includes a central processing unit (CPU), a graphics processing unit (GPU), a field programmable gate array (FPGA) 1501, a system memory 1504 including a random access memory (RAM) 1502 and a read-only memory (ROM) 1503, and a system bus 1505 connecting the system memory 1504 and the CPU 1501. The server 1500 further includes a basic input/output (I/O) system 1506 assisting in information transmission between devices in the server, and a large-capacity storage device 1507 configured to store an operating system 1513, an application program 1514, and other program modules 1515.

In some embodiments, the basic I/O system 1506 includes a display 1508 configured to display information and an input device 1509 such as a mouse or a keyboard that is configured to input information by a user. The display 1508 and the input device 1509 both are connected to the CPU 1501 by an input/output controller 1510 connected to the system bus 1505. The basic I/O system 1506 may further include the input/output controller 1510 to be configured to receive and process inputs from a plurality of other devices such as the keyboard, the mouse, or an electronic stylus. Similarly, the input/output controller 1510 further provides an output to a display screen, a printer, or other types of output devices.

The large-capacity storage device 1507 is connected to the CPU 1501 by means of the large-capacity storage controller (not shown) connected to the system bus 1505. The large-capacity storage device 1507 and a computer- readable medium associated therewith provide non-volatile storage for the server 1500. That is, the large-capacity storage device 1507 may include a computer-readable medium (not shown), such as a hard disk or a compact disc read-only memory (CD-ROM) driver.

Without loss of generality, the computer-readable medium may include a computer storage medium and a communi- cation medium. The computer storage medium includes volatile and non-volatile media, and removable and non- removable media implemented by using any method or technology used for storing information such as computer- readable instructions, data structures, program modules, or other data. The computer storage medium includes an RAM, an ROM, an erasable programmable read-only memory (EPROM), an electrically erasable programmable read-only memory (EEPROM), a flash memory or other solid-state memory technologies, a CD-ROM, a digital video disc (DVD) or other optical memories, a tape cartridge, a mag- netic tape, a magnetic disk memory, or other magnetic storage devices. Certainly, persons skilled in art may know that the computer storage medium is not limited to the foregoing several types. The system memory 1504 and the large-capacity storage device 1507 may be collectively referred to as a memory.

According to the embodiment of the present disclosure, the server 1500 may further be connected, by means of a network such as Internet, to a remote computer on the network for running. That is, the server 1500 may be connected to a network 1512 by means of a network interface unit 1511 connected to the system bus 1505, or may be connected to other types of networks or remote computer systems (not shown) by using the network inter- face unit 1511.

The memory further includes at least one instruction, at least one program, a code set or an instruction set, and the at least one instruction, at least one program, the code set or the instruction set are stored in the memory, and configured to be executed by one or more processors to implement the on-screen comment display method at the server side.

In one exemplary embodiment, also provided is a com- puter-readable storage medium. The storage medium stores at least one instruction, at least one program, and a code set or an instruction set, and the at least one instruction, the at least one program, the code set or the instruction set are executed by the processor of the terminal to implement the on-screen comment display method at the terminal side.

In one exemplary embodiment, also provided is a com- puter-readable storage medium. The storage medium stores at least one instruction, at least one program, and a code set or an instruction set, and the at least one instruction, the at least one program, the code set or the instruction set are executed by the processor of the server to implement the on-screen comment display method at the server side.

In some embodiments, the computer-readable storage medium may include a read-only memory (ROM), a ran- dom-access memory (RAM), a solid state drive (SSD), a disc, or the like. The RAM may include a resistance random access memory (ReRAM) and a dynamic random access memory (DRAM).

In one exemplary embodiment, also provided is a computer program product or a computer program, including computer instructions stored in a computer-readable storage medium. The processor of the terminal reads the computer instructions from the computer-readable storage medium, and the processor of the terminal executes the computer instructions, causing the terminal to execute the on-screen comment display method at the terminal side.

In one exemplary embodiment, also provided is a computer program product or a computer program, including computer instructions stored in a computer-readable storage medium. The processor of the server reads the computer instructions from the computer-readable storage medium, and the processor of the server executes the computer instructions, causing the server to execute the on-screen comment display method at the server side.

"A plurality of" mentioned in the description means two or more. "And/or" describes an association relationship for describing associated objects and represents that three relationships may exist. For example, A and/or B may represent the following three cases: only A exists, both A and B exist, and only B exists. The character "/" generally indicates an "or" relationship between the associated objects. In addition, the step numbers described in this description merely exemplarily show a possible execution sequence of the steps. In some other embodiments, the steps may not be executed according to the sequence of the numbers. For example, two steps having different numbers may be simultaneously performed, or two steps having different numbers may be performed according to a sequence contrary to the sequence shown in the figure. This is not limited in the embodiment of the present disclosure.

The foregoing description is merely exemplary embodiments of the present disclosure, but is not intended to limit the present disclosure. Any modification, equivalent replacement, or improvement made within the spirit and principle of the present disclosure shall fall within the scope of protection of the present disclosure.

What is claimed is:

1. An on-screen comment display method, executed by a terminal, the method comprising:
   playing back a video in a video playback interface, the video corresponding to an on-screen comment data set that comprises on-screen comments of the video;
   displaying on-screen comments of the video during playback of the video;
   selecting, from the on-screen comment data set, a plurality of target on-screen comments associated with a target word;
   generating annotation information corresponding to the plurality of target on-screen comments, the annotation information indicating information related to combine and display the plurality of target on-screen comments to form a graphic associated with the target word; and
   combining and displaying, according to the annotation information and within a target playback time period of the video, the plurality of target on-screen comments associated with the target word to form the graphic associated with the target word, wherein the plurality of target on-screen comments in text forms are located at different display positions simultaneously to jointly form a visual graphical shape as the graphic.

2. The method according to claim 1, wherein the selecting, from the on-screen comment data set, a plurality of target on-screen comments associated with a target word comprises:
   performing word segmentation on on-screen comments in the on-screen comment data set to obtain a word data set;
   selecting the target word from the word data set;
   selecting, from the on-screen comment data set, on-screen comments associated with the target word to generate a candidate on-screen comment set; and
   selecting the plurality of target on-screen comments from the candidate on-screen comment set.

3. The method according to claim 2, wherein the selecting the target word from the word data set comprises:
   performing screening on the word data set according to occurrence frequencies of words in the word data set to obtain a candidate word set; and
   determining, when a graphic information library comprises graphic information corresponding to a target candidate word in the candidate word set, the target candidate word to be the target word, wherein the graphic information indicates the graphic associated with the target word.

4. The method according to claim 2, wherein the selecting the plurality of target on-screen comments from the candidate on-screen comment set comprises:
   determining a plurality of display positions corresponding to the target word according to the graphic information of the target word, the display positions being used for displaying the target on-screen comments; and
   sequentially selecting, according to a descending order of lengths of the display positions, the target on-screen comments of the display positions from the candidate on-screen comment set.

5. The method according to claim 4, wherein the quantity of the display positions corresponding to the target word is m, and m is a positive integer; and
   the sequentially selecting, according to a descending order of lengths of the display positions, the target on-screen comments of the display positions from the candidate on-screen comment set comprises:
   determining, according to a length of an ith display position in the m display positions and length of at least one candidate on-screen comment in the candidate on-screen comment set, a target on-screen comment displayed at the ith display position, wherein i is a positive integer with a starting value of 1, and the length of the ith display position is greater than or equal to a length of a (i+1) th display position;
   removing the target on-screen comment of the ith display position from the candidate on-screen comment set; and
   changing, when i is less than m, a value of i to be equal to i plus 1, and continuing execution an operation of the determining, according to a length of an ith display position in the m display positions and a length of at least one candidate on-screen comment in the candidate on-screen comment set, a target on-screen comment at the ith display position.

6. The method according to claim 4, wherein the generating annotation information corresponding to the plurality of target on-screen comments comprises:
   acquiring position information of a target display position in the plurality of display positions, the position information indicating a position of the target display position in the graphic; and generating, according to the position information of the target display position, the annotation information corresponding to the target on-screen comment displayed at the target display position.

7. The method according to claim 1, further comprising: determining a display time period of the plurality of target on-screen comments according to an average value of timestamps of the plurality of target on-screen comments.

8. The method according to claim 1, further comprising: segmenting a playback duration of the video to obtain a plurality of playback time periods of the video, and acquiring on-screen comment data sets respectively corresponding to the plurality of playback time periods; and the selecting, from the on-screen comment data set, a plurality of target on-screen comments associated with a target word comprises: respectively selecting, from the on-screen comment data sets respectively corresponding to the plurality of playback time periods, the plurality of target on-screen comments associated with the target word corresponding to the plurality of playback time periods.

9. The method according to claim 1, further comprising: acquiring, in response to that a quantity of newly added on-screen comments of the video is greater than or equal to a first threshold value, an updated on-screen comment data set; selecting, from the updated on-screen comment data set, a plurality of updated target on-screen comments associated with an updated target word; and generating annotation information corresponding to the plurality of updated target on-screen comments.

10. The method according to claim 1, wherein the combining and displaying, within a target playback time period of the video, a plurality of target on-screen comments associated with a target word to form a graphic associated with the target word comprises:
    acquiring respective annotation information of the plurality of target on-screen comments, the annotation information indicating display positions of the target on-screen comments in the graphic;
    determining the display positions of the plurality of the target on-screen comments in the graphic according to the respective annotation information of the plurality of target on-screen comments; and
    displaying, within the target playback time period of the video, the plurality of target on-screen comments according to the display positions of the plurality of target on-screen comments in the graphic.

11. The method according to claim 10, wherein the displaying the plurality of target on-screen comments according to the display positions of the plurality of target on-screen comments in the graphic comprises:
    overlaying and displaying, when a length of a first target on-screen comment is equal to a length of a display position of the first target on-screen comment in the graphic, the first target on-screen comment at the display position of the first target on-screen comment in the graphic;
    or
    copying and displaying, when the length of the first target on-screen comment is less than the length of the display position of the first target on-screen comment in the graphic, the first target on-screen comment at the display position of the first target on-screen comment in the graphic;

or
    cropping and displaying, when the length of the first target on-screen comment is greater than the length of the display position of the first target on-screen comment in the graphic, the first target on-screen comment at the display position of the first target on-screen comment in the graphic; wherein
the first target on-screen comment is one of the plurality of target on-screen comments.

12. The method according to claim 1, wherein the combining and displaying, within a target playback time period of the video, a plurality of target on-screen comments associated with a target word to form a graphic associated with the target word comprises:
    acquiring graphic information of the target word, the graphic information indicating the graphic associated with the target word;
    determining a plurality of display positions corresponding to the target word according to the graphic information of the target word;
    performing matching on lengths of the plurality of display positions and lengths of the plurality of target on-screen comments, and determining the display positions of the plurality of target on-screen comments in the graphic; and
    displaying, within the target playback time period of the video, the plurality of target on-screen comments according to the display positions of the plurality of target on-screen comments in the graphic.

13. The method according to claim 1, further comprising: determining, in response to a trigger operation for an on-screen comment filtering control, a filtering coefficient, the filtering coefficient indicating a filtering proportion of the on-screen comments having the same text content; and
    filtering the on-screen comments of the video according to the filtering coefficient, wherein
    in the on-screen comments of the video, the on-screen comments other than the target on-screen comments are filtered according to the filtering coefficient.

14. The method according to claim 1, further comprising: displaying, outside a safety range based on the graphic, at least one on-screen comment other than the target on-screen comments.

15. A non-transitory computer-readable storage medium, the storage medium storing at least one instruction, at least one program, and a code set or an instruction set, and the at least one instruction, the at least one program, and the code set or the instruction set being loaded and executed by at least one processor to implement:
    playing back a video in a video playback interface, the video corresponding to an on-screen comment data set that comprises on-screen comments of the video;
    displaying on-screen comments of the video during playback of the video;
    selecting, from the on-screen comment data set, a plurality of target on-screen comments associated with a target word;
    generating annotation information corresponding to the plurality of target on-screen comments, the annotation information indicating information related to combine and display the plurality of target on-screen comments to form a graphic associated with the target word; and
    combining and displaying, according to the annotation information and within a target playback time period of the video, the plurality of target on-screen comments associated with the target word to form the graphic associated with the target word, wherein the plurality of target on-screen comments in text forms are located at different display positions simultaneously to jointly form a visual graphical shape as the graphic.

16. The storage medium according to claim 15, wherein the combining and displaying, within the target playback time period of the video, the plurality of target on-screen comments comprises:

acquiring respective annotation information of the plurality of target on-screen comments, the annotation information indicating display positions of the target on-screen comments in the graphic;

determining the display positions of the plurality of the target on-screen comments in the graphic according to the respective annotation information of the plurality of target on-screen comments; and displaying, within the target playback time period of the video, the plurality of target on-screen comments according to the display positions of the plurality of target on-screen comments in the graphic.

17. The storage medium according to claim 15, wherein the combining and displaying, within the target playback time period of the video, the plurality of target on-screen comments comprises:

acquiring graphic information of the target word, the graphic information indicating the graphic associated with the target word;

determining a plurality of display positions corresponding to the target word according to the graphic information of the target word;

performing matching on lengths of the plurality of display positions and lengths of the plurality of target on-screen comments, and determining the display positions of the plurality of target on-screen comments in the graphic; and displaying, within the target playback time period of the video, the plurality of target on-screen comments according to the display positions of the plurality of target on-screen comments in the graphic.

18. A computer device, comprising:

at least one memory; and at least one processor coupled to the at least one memory and configured to perform:

playing back a video in a video playback interface, the video corresponding to an on-screen comment data set that comprises on-screen comments of the video;

displaying on-screen comments of the video during playback of the video;

selecting, from the on-screen comment data set, a plurality of target on-screen comments associated with a target word;

generating annotation information corresponding to the plurality of target on-screen comments, the annotation information indicating information related to combine and display the plurality of target on-screen comments to form a graphic associated with the target word; and combining and displaying, according to the annotation information and within a target playback time period of the video, the plurality of target on-screen comments associated with the target word to form the graphic associated with the target word, wherein the plurality of target on-screen comments in text forms are located at different display positions simultaneously to jointly form a visual graphical shape as the graphic.

* * * * *